United States Patent
Liu et al.

(10) Patent No.: US 12,259,761 B2
(45) Date of Patent: Mar. 25, 2025

(54) ROTATING MECHANISM AND FOLDABLE ELECTRONIC DEVICE

(71) Applicant: HONOR DEVICE CO., LTD., Guangdong (CN)

(72) Inventors: Kun Liu, Shenzhen (CN); Shaohong Dong, Shenzhen (CN); Ruihao Chen, Shenzhen (CN); Changfu Dong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/005,918

(22) PCT Filed: Sep. 7, 2022

(86) PCT No.: PCT/CN2022/117534
§ 371 (c)(1),
(2) Date: Jan. 18, 2023

(87) PCT Pub. No.: WO2023/045758
PCT Pub. Date: Mar. 30, 2023

(65) Prior Publication Data
US 2024/0248513 A1    Jul. 25, 2024

(30) Foreign Application Priority Data
Sep. 26, 2021   (CN) .......................... 202111132029.1

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/022* (2013.01); *H04M 1/0268* (2013.01); *G06F 1/1618* (2013.01)

(58) Field of Classification Search
CPC .... G06F 1/1652; G06F 1/1681; H04M 1/022; H04M 1/0268
See application file for complete search history.

(56) References Cited

U.S. PATENT DOCUMENTS

| 11,336,759 B2 * | 5/2022 | Liao ...................... H04M 1/022 |
| 2015/0233162 A1 * | 8/2015 | Lee ...................... H04M 1/022 16/223 |

(Continued)

FOREIGN PATENT DOCUMENTS

| CN | 109830185 A | 5/2019 |
| CN | 110035140 A | 7/2019 |

(Continued)

*Primary Examiner* — Nidhi Thaker
(74) *Attorney, Agent, or Firm* — Fish & Richardson P.C.

(57) ABSTRACT

A rotating mechanism and a foldable electronic device is provided. The rotating mechanism includes a fixed base, a flexible support member, a first rotating member, and a second rotating member. A first rotating body of the first rotating member is installed in a first rotating groove of the fixed base and is slidable along the first rotating groove. When the first rotating body rotates relative to the fixed base along the first rotating groove, the flexible support member is driven to bend or unfold. A second rotating body is installed in a second rotating groove of the fixed base and is slidable along the second rotating groove. When the second rotating body rotates relative to the fixed base along the second rotating groove, the flexible support member is driven to bend or unfold.

17 Claims, 14 Drawing Sheets

(56) References Cited

U.S. PATENT DOCUMENTS

| | | | |
|---|---|---|---|
| 2021/0034117 A1* | 2/2021 | Torres | G06F 1/1652 |
| 2021/0119171 A1* | 4/2021 | Kim | H10K 50/84 |
| 2021/0271294 A1 | 9/2021 | Li et al. | |
| 2021/0381289 A1* | 12/2021 | Hsu | H04M 1/022 |
| 2022/0141981 A1* | 5/2022 | Hsu | H05K 5/0226 |
| | | | 16/337 |

FOREIGN PATENT DOCUMENTS

| | | | |
|---|---|---|---|
| CN | 110445913 A | 11/2019 | |
| CN | 111692196 A | 9/2020 | |
| CN | 113067923 A | 7/2021 | |
| CN | 113140156 A | 7/2021 | |
| CN | 113163030 A | 7/2021 | |
| CN | 113315860 A | 8/2021 | |
| WO | WO-2021129882 A1 * | 7/2021 | F16C 11/12 |

* cited by examiner

ROTATING MECHANISM AND FOLDABLE ELECTRONIC DEVICE

CROSS-REFERENCE TO RELATED APPLICATIONS

This application is a national stage of International Application No. PCT/CN2022/117534, filed on Sep. 7, 2022, which claims priority to Chinese Patent Application No. 202111132029.1, filed on Sep. 26, 2021. The disclosures of both of the aforementioned applications are hereby incorporated by reference in their entireties.

This application claims priority to Chinese Patent Application No. 202111132029.1, filed with China National Intellectual Property Administration on Sep. 26, 2021 and entitled "ROTATING MECHANISM AND FOLDABLE ELECTRONIC DEVICE", which is incorporated herein by reference in its entirety.

TECHNICAL FIELD

This application relates to field of electronic product technologies, and in particular, to a rotating mechanism and a foldable electronic device.

BACKGROUND

A flexible display is bendable, so that an electronic device equipped with the flexible display, namely, a foldable electronic device, can switch between folded and unfolded states. With relatively large areas for display and portability convenience, foldable electronic devices are becoming increasingly popular among consumers. However, during a folding process of a conventional foldable electronic device, a bending position of a flexible display is easily squeezed, which may finally cause damage to the flexible display, affecting service life of the flexible display.

SUMMARY

This application provides a rotating mechanism and a foldable electronic device, to resolve a technical problem that a bending position of a flexible display of a conventional foldable electronic device is easily squeezed during a folding process.

According to a first aspect, this application provides a rotating mechanism, including a fixed base, a flexible support member, a first rotating member, and a second rotating member. The rotating mechanism includes an unfolded state and a folded state. In the unfolded state, the flexible support member is flattened, and in the folded state, the flexible support member is bent.

The fixed base includes an upper casing and a lower casing. The upper casing and the lower casing are disposed to be stacked and fixedly connected. A bottom plate of the lower casing is provided with a first rotating groove and a second rotating groove. The first rotating groove and the second rotating groove is disposed opposite to each other. Two opposite side plates of the upper casing are provided with a first notch and a second notch. The first notch is disposed corresponding to the first rotating groove, and the second notch is disposed corresponding to the second rotating groove.

The flexible support member includes a first side portion and a second side portion, the first side portion and the second side portion are respectively located on two opposite sides of the flexible support member, and the flexible support member is located on a surface of the fixed base.

The first rotating member includes a first swingarm, the first swingarm includes a first rotating body and a first rotating portion, and the first rotating body is fixedly connected to the first rotating portion. The first rotating portion is rotatably connected to the first side portion of the flexible support member, and the first rotating body extends into the first rotating groove through the first notch, and is installed in the first rotating groove and slidable along the first rotating groove. When the first rotating body rotates relative to the fixed base along the first rotating groove in a direction of getting away from the first rotating groove, the first rotating portion rotates relative to the flexible support member and the first rotating portion drives the flexible support member to unfold. When the first rotating body rotates relative to the fixed base along the first rotating groove in a direction of extending into the first rotating groove, the first rotating portion rotates relative to the flexible support member and the first rotating portion drives the flexible support member to bend.

The second rotating member includes a second swingarm, the second swingarm includes a second rotating body and a second rotating portion, and the second rotating body is fixedly connected to the second rotating portion. The second rotating portion is rotatably connected to the second side portion of the flexible support member, and the second rotating body extends into the second rotating groove through the second notch, and is installed in the second rotating groove and slidable along the second rotating groove. When the second rotating body rotates relative to the fixed base along the second rotating groove in a direction of getting away from the second rotating groove, the second rotating portion rotates relative to the flexible support member and the second rotating body drives the flexible support member to unfold. When the second rotating body rotates relative to the fixed base along the second rotating groove in a direction of extending into the second rotating groove, the second rotating portion rotates relative to the flexible support member and the second rotating body drives the flexible support member to bend. A rotation direction of the second rotating member and a rotation direction of the first rotating member are opposite.

The rotating mechanism is applied to a foldable electronic device, and the foldable electronic device includes a display. In this embodiment, folding or unfolding of the foldable electronic device can be achieved through rotation of the rotating mechanism. When the foldable electronic device is in the folded state, the display is bent.

In the rotating mechanism illustrated in this application, the bendable flexible support member is disposed and is stacked on the fixed base, and the first swingarm of the first rotating member and the second swingarm of the second rotating member are movably connected to the fixed base. When the first swingarm and the second swingarm rotate, the flexible support member is bent and there is space in a bending position of the flexible support member, so as to provide bending space for the display, thereby preventing the flexible support member from squeezing the display to cause damage to the display when the rotating mechanism is folded. In addition, a round corner formed when the display is bent can also be avoided, so that a foldable part of the display is not bent by a relatively large angle, to avoid adverse phenomena such as creases on the display, thereby prolonging service life of the display. In addition, the flexible support member in the rotating mechanism provided in this application can be bent, to reduce a thickness of the rotating mechanism, which facilitates thinning of the foldable electronic device.

For ease of description, a first reference plane and a second reference plane are set in this application. The first reference plane is perpendicular to a second direction, and the second reference plane is perpendicular to a first direction. Actually, the first reference plane and the second reference plane are planes of symmetry of the rotating mechanism, where the rotating mechanism is axially symmetric with respect to the first reference plane and the second reference plane. The first direction is a width direction of the rotating mechanism, and the second direction is a length direction of the rotating mechanism.

The first rotating member and the second rotating member are mirror-symmetric with respect to the second reference plane, the fixed base is symmetric with respect to both the first reference plane and the second reference plane, and the flexible support member is symmetric with respect to both the first reference plane and the second reference plane.

A rotating assembly further includes a third rotating member and a fourth rotating member. A structure of the third rotating member is the same as that of the first rotating member, and the third rotating member and the first rotating member are symmetric with respect to the second reference plane. A structure of the fourth rotating member is the same as that of the second rotating member, and the fourth rotating member and the second rotating member are symmetric with respect to the first reference plane. The third rotating member and the fourth rotating member rotate simultaneously with the first rotating member and the second rotating member to achieve folding and unfolding of the rotating mechanism.

In an implementation, when the rotating mechanism is in the folded state, the flexible support member is bent to form avoidance space.

In this embodiment, when the rotating mechanism is in the folded state, the flexible support member accordingly provides bending space for the display, so as to prevent the flexible support member from being squeezed to cause damage to the display when the display is bent. When the rotating mechanism is in the unfolded state, the flexible support member is unfolded, to have an effect of supporting the display, thereby ensuring good display of the display.

In an implementation, the flexible support member includes a bending portion, the bending portion is connected between the first side portion and the second side portion, and the bending portion is bendable. When the rotating mechanism is in the folded state, the first rotating member and the second rotating member rotate in a direction of approaching each other, to drive the first side portion and the second side portion to move in a direction of getting away from the fixed base. In addition, the bending portion is bent to form avoidance space, so as to accommodate the display.

In this embodiment, the bending portion is made of a flexible material. Specifically, the bending portion may be made of a rubber material, or may be made of a thermoplastic elastomer or another flexible material. In this embodiment, a flexible material is used completely between the first side portion and the second side portion, and deformation of the flexible support member can be generated under applied force. When the rotating mechanism is in the folded state, the bending portion of the flexible support member is bent, so as to provide bending space for the display, and prevent the flexible support member from squeezing the display to cause damage to the display.

In an implementation, the flexible support member includes a rigid portion, a first bending portion, and a second bending portion, the first bending portion is connected between the rigid portion and the first side portion, the second bending portion is connected between the rigid portion and the second side portion, and both the first bending portion and the second bending portion are bendable. When the rotating mechanism is in the folded state, the first rotating member and the second rotating member rotate in the direction of approaching each other, to drive the first side portion and the second side portion to move in a direction of getting away from the fixed base, and the rigid portion to move in a direction of approaching the fixed base. In addition, the first bending portion and the second bending portion are bent toward a same direction to form avoidance space, so as to accommodate the display.

In this embodiment, the first bending portion and the second bending portion are easily bent under applied force, so as to provide bending space for the bending part of the display, and prevent the flexible support member from squeezing the display to cause damage to the display. The rigid portion made of a rigid material is not prone to deformation, has relatively high strength, and has an effect of increasing strength of the flexible support member, and meanwhile, a preset shape can be formed when the flexible support member is in the folded state, so that the avoidance space formed by bending of the flexible support member can better fit bending of the foldable part of the display.

In an implementation, the first bending portion includes a first rigid section, a first flexible section, and a second flexible section. The first flexible section and the second flexible section are respectively connected to two opposite sides of the first rigid section. The first flexible section is connected to the first side portion, and the second flexible section is connected to the rigid portion. The second bending portion includes a second rigid section, a third flexible section, and a fourth flexible section, the third flexible section and the fourth flexible section are respectively connected to two opposite sides of the second rigid section, the third flexible section is connected to the rigid portion, and the fourth flexible section is connected to the second side portion.

When the rotating mechanism is in the folded state, the first rotating member and the second rotating member rotate in the direction of approaching each other, to drive the first side portion and the second side portion to move in a direction of getting away from the fixed base, and the rigid portion to move in the direction of approaching the fixed base. In addition, the first flexible section, the second flexible section, the third flexible section, and the fourth flexible section are deformed and bent, and the first rigid section and the second rigid section are not deformed, to form avoidance space with a specific shape, so as to accommodate the display.

In this embodiment, the first flexible section, the second flexible section, the third flexible section, and the fourth flexible section are all made of a flexible material, which may be specifically a rubber material, a thermoplastic elastomer, or another flexible material. The first rigid section, the second rigid section, and the rigid portion are all made of a rigid material such as stainless steel, aluminum, or copper.

When the rotating mechanism is in the folded state, the first flexible section, the second flexible section, the third flexible section, and the fourth flexible section are all bent, so that the flexible support member is bent to form avoidance space, so as to provide bending space for a display, and avoid adverse phenomena such as creases on the display, thereby prolonging service life of the display. Strength of the flexible support member can be further increased by disposing the first rigid section and the second rigid section. Moreover, when the rotating mechanism is in the folded state, the flexible support member can be bent to form a preset shape, so that the flexible support member can better fit a foldable part of the display.

In an implementation, the first bending portion includes a first bending sub-portion and a second bending sub-portion, the first bending sub-portion and the second bending sub-portion are arranged at intervals side by side along a thickness direction of the flexible support member, two opposite ends of the first bending sub-portion are respectively connected to the rigid portion and the first side portion, and two opposite ends of the second bending sub-portion are respectively connected to the rigid portion and the first side portion. The second bending portion includes a third bending sub-portion and a fourth bending sub-portion, the third bending sub-portion and the fourth bending sub-portion are arranged at intervals side by side along the thickness direction of the flexible support member, two opposite ends of the third bending sub-portion are respectively connected to the rigid portion and the second side portion, and two opposite ends of the fourth bending sub-portion are respectively connected to the rigid portion and the second side portion.

When the rotating mechanism is in the folded state, the first rotating member and the second rotating member rotate in the direction of approaching each other, to drive the first side portion and the second side portion to move in a direction of getting away from the fixed base, and the rigid portion to move in a direction of approaching the fixed base. In addition, the first bending sub-portion, the second bending sub-portion, the third bending sub-portion, and the fourth bending sub-portion are all bent to form avoidance space, so as to accommodate the display.

In this embodiment, the first bending sub-portion and the second bending sub-portion are arranged at intervals, so that bending space can be provided for the first bending sub-portion after the second bending sub-portion is bent, to increase a bending degree of the first bending sub-portion. The third bending sub-portion and the fourth bending sub-portion are arranged at intervals, so that bending space can be provided for the third bending sub-portion after the fourth bending sub-portion is bent, to further increase avoidance space formed by bending of the flexible support member, and further provide bending space for the display, thereby preventing the flexible support member from being squeezed to cause damage to the display when the display is bent.

In an implementation, the first bending sub-portion includes a first rigid sub-section, a first flexible sub-section, and a second flexible sub-section, the first flexible sub-section and the second flexible sub-section are respectively connected to two opposite sides of the first rigid sub-section, the first flexible sub-section is connected to the first side portion, and the second flexible sub-section is connected to the rigid portion. The second bending sub-portion includes a second rigid sub-section, a third flexible sub-section, and a fourth flexible sub-section, the third flexible sub-section and the fourth flexible sub-section are respectively connected to two opposite sides of the second rigid sub-section, the third flexible sub-section is connected to the first side portion, and the fourth flexible sub-section is connected to the rigid portion.

The third bending sub-portion includes a third rigid sub-section, a fifth flexible sub-section, and a sixth flexible sub-section, the fifth flexible sub-section and the sixth flexible sub-section are respectively connected to two opposite sides of the third rigid sub-section, the fifth flexible sub-section is connected to the rigid portion, and the sixth flexible sub-section is connected to the second side portion. The fourth bending sub-portion includes a fourth rigid sub-section, a seventh flexible sub-section, and an eighth flexible sub-section, the seventh flexible sub-section and the eighth flexible sub-section are respectively connected to two opposite sides of the fourth rigid sub-section, the seventh flexible sub-section is connected to the rigid portion, and the eighth flexible sub-section is connected to the second side portion.

When the rotating mechanism is in the folded state, the first flexible sub-section, the second flexible sub-section, the third flexible sub-section, the fourth flexible sub-section, the fifth flexible sub-section, the sixth flexible sub-section, the seventh flexible sub-section, and the eighth flexible sub-section are all bent.

In this embodiment, when the rotating mechanism is in the folded state, the second flexible sub-section and the fourth flexible sub-section are bent toward a same direction, the first flexible sub-section and the third flexible sub-section are bent toward a same direction, and the first rigid sub-section and the second rigid sub-section keep unchanged in shape and are displaced in their extending directions. The sixth flexible sub-section and the eighth flexible sub-section are bent toward a same direction, the fifth flexible sub-section and the seventh flexible sub-section are bent toward a same direction, and the third rigid sub-section and the fourth rigid sub-section keep unchanged in shape and are displaced in their extending directions. In this way, the flexible support member is bent to form avoidance space in a shape of a water drop, so that the shape of the avoidance space better fits a shape formed by bending of the display, to further prevent the flexible support member from squeezing the display to cause damage to the display, and in addition, to avoid adverse phenomena such as creases on the display, thereby prolonging service life of the display.

In an implementation, the flexible support member is provided with a first through-hole and a second through-hole, the first through-hole and the first swingarm are disposed opposite to each other, and the second through-hole and the second swingarm are disposed opposite to each other. The first through-hole and the second through-hole are symmetric with respect to the first reference plane. When the rotating mechanism is in the unfolded state, the first through-hole is configured to accommodate an end part of the first swingarm, and the second through-hole is configured to accommodate an end part of the second swingarm.

The first through-hole is configured to avoid an end part, facing away from a first swing portion, of the first swingarm, so as to prevent the first swingarm from abutting against the flexible support member to cause damage to the flexible support member when the first swingarm rotates relative to the fixed base. The second through-hole is configured to avoid an end part, facing away from a second swing portion, of the second swingarm, so as to prevent the second swingarm from abutting against the flexible support member to cause damage to the flexible support member when the second swingarm rotates relative to the fixed base.

In an implementation, one end of the first rotating body is provided with a first avoidance groove, and a groove opening direction of the first avoidance groove is in an extending direction of the first rotating body. One end of the second rotating body is provided with a second avoidance groove, and a groove opening direction of the second avoidance groove is in an extending direction of the second rotating body. When the rotating mechanism is in the unfolded state, a part of the flexible support member is located in the first avoidance groove and the second avoidance groove.

The first avoidance groove is configured to avoid the flexible support member to prevent an end part of the first swingarm from abutting against the flexible support member to cause damage to the flexible support member when the rotating mechanism is in the unfolded state. The second avoidance groove is configured to avoid the flexible support member to prevent an end part of the second swingarm from abutting against the flexible support member to cause damage to the flexible support member when the rotating mechanism is in the unfolded state.

In an implementation, when the first rotating body rotates relative to the fixed base along the first rotating groove and the second rotating body rotates relative to the fixed base along the second rotating groove, the first rotating portion and the second rotating portion drive the flexible support member to bend or unfold.

When the first rotating body rotates relative to the fixed base along the first rotating groove in a direction of getting away from the first rotating groove, the first rotating portion rotates relative to the flexible support member and the first rotating portion drives the flexible support member to unfold. When the first rotating body rotates relative to the fixed base along the first rotating groove in a direction of extending into the first rotating groove, the first rotating portion rotates relative to the flexible support member and the first rotating portion drives the flexible support member to bend.

When the second rotating body rotates relative to the fixed base along the second rotating groove in a direction of getting away from the second rotating groove, the second rotating portion rotates relative to the flexible support member and the second rotating body drives the flexible support member to unfold. When the second rotating body rotates relative to the fixed base along the second rotating groove in a direction of extending into the second rotating groove, the second rotating portion rotates relative to the flexible support member and the second rotating body drives the flexible support member to bend.

In an implementation, the first swingarm further includes a first swing portion, and the first swing portion is in a flat plate-like shape. The first swing portion is fixedly connected to the first rotating body. When the first swing portion rotates in a direction of getting away from the fixed base, the first rotating body slides along the first rotating groove in a direction of getting away from the first rotating groove, the first rotating portion rotates relative to the flexible support member, and the first rotating portion drives the flexible support member to unfold. When the first swing portion rotates in a direction of approaching the fixed base, the first rotating body slides along the first rotating groove in a direction of extending into the first rotating groove, the first rotating portion rotates relative to the flexible support member, and the first rotating portion drives the flexible support member to bend.

The second swingarm further includes a second swing portion, and the first swing portion is in a flat plate-like shape. The second swing portion is fixedly connected to the second rotating body: When the second swing portion rotates in a direction of getting away from the fixed base, the second rotating body slides along the second rotating groove in a direction of getting away from the second rotating groove, the second rotating portion rotates relative to the flexible support member, and the second rotating portion drives the flexible support member to unfold. When the second swing portion rotates in a direction of approaching the fixed base, the second rotating body slides along the second rotating groove in a direction of extending into the second rotating groove, the second rotating portion rotates relative to the flexible support member, and the second rotating portion drives the flexible support member to bend.

In this embodiment, the first rotating body and the first rotating portion are driven to rotate through rotation of the first swing portion, and the second rotating body and the second rotating portion are driven to rotate through rotation of the second swing portion, so as to drive the flexible support member to bend or be flattened, thereby achieving folding or unfolding of the rotating mechanism and ensuring rotation stability of the rotating mechanism.

In an implementation, the first swingarm further includes a first rotating shaft, and the first rotating shaft is fixedly connected to one end, facing away from the first rotating body, of the first swing portion. The first rotating member further includes a first fixing plate, and the first fixing plate is provided with a first shaft hole. A first rotating shaft is located in the first shaft hole, so that the first fixing plate is rotatably connected to the first rotating shaft. The second swingarm further includes a second rotating shaft, and the second rotating shaft is fixedly connected to one end, facing away from the second rotating body, of the second swing portion. The second rotating member further includes a second fixing plate, the second fixing plate is provided with a second shaft hole, and the second rotating shaft is located in the second shaft hole, so that the second fixing plate is rotatably connected to the second rotating shaft.

When the first fixing plate and the second fixing plate rotate in a direction of approaching each other, the first swingarm and the second swingarm rotate relative to the fixed base in a direction of approaching each other, and the first rotating portion and the second rotating portion drive the flexible support member to bend, so that the rotating mechanism is in the folded state. When the first fixing plate and the second fixing plate rotate in a direction of getting away from each other, the first swingarm and the second swingarm rotate relative to the fixed base in a direction of getting away from each other, and the first rotating portion and the second rotating portion drive the flexible support member to be flattened, so that the rotating mechanism is in the unfolded state.

In this embodiment, the first swingarm is driven to rotate through rotation of the first fixing plate, and the second swingarm is driven to rotate through rotation of the second fixing plate, so as to drive the flexible support member to bend or be flattened, thereby achieving folding or unfolding of the rotating mechanism and further ensuring rotation stability of the rotating mechanism and the foldable electronic device.

In an implementation, the rotating mechanism further includes a first door panel and a second door panel, the first door panel is fixedly connected to the first fixing plate, and the second door panel is fixedly connected to the second fixing plate. When the first door panel and the second door panel rotate in a direction of approaching each other, the first rotating member and the second rotating member rotate relative to the fixed base in a direction of approaching each other, and the first rotating portion and the second rotating portion drive the flexible support member to bend, so that the rotating mechanism is in the folded state. When the first door panel and the second door panel rotate in a direction of getting away from each other, the first rotating member and the second rotating member rotate relative to the fixed base in a direction of getting away from each other, and the first rotating portion and the second rotating portion drive the flexible support member to be flattened, so that the rotating mechanism is in the unfolded state.

The first door panel is configured to fixedly connect to a first casing of the foldable electronic device, and the second door panel is configured to fixedly connect to a second casing of the foldable electronic device. In this embodiment, when the rotating mechanism rotates, the first door panel drives the first casing to rotate, and the second door panel drives the second casing to rotate, so as to achieve relative rotation of the first casing and the second casing, that is, achieve unfolding or folding of the foldable electronic device. The first door panel and the second door panel are disposed, to increase stability of connection between the rotating mechanism and the first casing and second casing, and ensure rotation stability of the rotating mechanism and the foldable electronic device.

In an implementation, the fixed base is further provided with a first auxiliary rotating groove and a second auxiliary rotating groove, the first auxiliary rotating groove and the first rotating groove are arranged side by side, and an extending direction of the first auxiliary rotating groove is the same as an extending direction of the first rotating groove, the second auxiliary rotating groove and the second rotating groove are arranged side by side, and an extending direction of the second auxiliary rotating groove is the same as an extending direction of the second rotating groove.

The first swingarm further includes a first auxiliary rotating body; the first auxiliary rotating body is fixedly connected to the first rotating body, an extending direction of the first auxiliary rotating body is same as an extending direction of the first rotating body, and the first auxiliary rotating body is installed in the first auxiliary rotating groove and is slidable along the first auxiliary rotating groove.

The second swingarm further includes a second auxiliary rotating body, the second auxiliary rotating body is fixedly connected to the second rotating body, an extending direction of the second auxiliary rotating body is same as an extending direction of the second rotating body, and the second auxiliary rotating body is installed in the second auxiliary rotating groove and is slidable along the second auxiliary rotating groove.

In this embodiment, at the same time when the first rotating body rotates in the first rotating groove, the first auxiliary rotating body rotates in the first auxiliary rotating groove, so as to achieve rotation of the first swingarm relative to the fixed base, thereby improving stability of rotation of the first swingarm relative to the fixed base. At the same time when the second rotating body rotates in the second rotating groove, the second auxiliary rotating body rotates in the second auxiliary rotating groove, so as to achieve rotation of the second swingarm relative to the fixed base, thereby improving stability of rotation of the second swingarm relative to the fixed base.

According to a second aspect, this application provides a foldable electronic device, including a first casing, a second casing, a display, and the foregoing rotating mechanism. The rotating mechanism is connected between the first casing and the second casing, and the display is installed on the first casing, the second casing, and the rotating mechanism. When the rotating mechanism rotates, the first casing and the second casing rotates relative to each other, to drive the display to bend or unfold.

When the foldable electronic device is in an unfolded state, the first casing and the second casing are unfolded relative to each other, and the rotating mechanism is in the unfolded state. When the foldable electronic device is in a folded state, the first casing and the second casing are folded relative to each other, and the rotating mechanism is in the folded state. When the foldable electronic device provided in this embodiment uses the foregoing rotating mechanism. When the foregoing rotating mechanism is in the folded state, the flexible support member can be bent, to provide bending space for the display, so that when the foldable electronic device is in the folded state, the flexible support member does not squeeze the display, thereby avoiding damage caused to the display and prolonging service life of the display.

In an implementation, the display includes a first display part, a second display part, and a foldable part, the foldable part is connected between the first display part and the second display part, the first display part is installed on the first casing, the second display part is installed on the second casing, and the foldable part and the rotating mechanism are disposed opposite to each other.

When the foldable electronic device is in the unfolded state, the first casing, the second casing, and the rotating mechanism jointly support the display, so as to ensure normal display of the display and meanwhile achieve large-screen display, thereby improving use experience of a user. When the foldable electronic device is in the folded state, the foldable part of the display is bent, and the first display part and the second display part are disposed opposite to each other. In this case, the display is located between the first casing and the second casing, and an exposed area of the display is small, which can greatly reduce a probability of damage to the display and achieve effective protection of the display. In addition, the flexible support member of the rotating mechanism is bent, to avoid bending and deformation of a bendable part, so as to prevent the flexible support member from squeezing the display to cause damage to the display.

In an implementation, when the foldable electronic device is in the folded state, the flexible support member is bent to form avoidance space, and the bendable part is at least partially located in the avoidance space, so that the foldable part is not bent by a relatively large angle, to avoid adverse phenomena such as creases on the display, thereby prolonging service life of the display.

In summary, the rotating mechanism illustrated in this application is applied to a foldable electronic device, and the foldable electronic device includes a display. Folding or unfolding of the foldable electronic device can be achieved through rotation of the rotating mechanism. When the electronic device is in the folded state, the display is bent.

The bendable flexible support member is disposed and is stacked on a fixed base, and a first swingarm of a first rotating member and a second swingarm of a second rotating member are movably connected to the fixed base. When the first swingarm and the second swingarm rotate, the flexible support member is bent and there is space in a bending position of the flexible support member, so as to provide bending space for the display, thereby preventing the flexible support member from squeezing the display to cause damage to the display when the rotating mechanism is folded. In addition, a round corner formed when the display is bent can also be avoided, so that a foldable part of the display is not bent by a relatively large angle, to avoid adverse phenomena such as creases on the display, thereby prolonging service life of the display. In addition, the flexible support member in the rotating mechanism provided in this application can be bent, to reduce a thickness of the rotating mechanism, which facilitates thinning of the foldable electronic device.

BRIEF DESCRIPTION OF DRAWINGS

To describe the technical solutions in the embodiments of this application or the background more clearly, the following describes the accompanying drawings required for use in the embodiments of this application or the background.

DESCRIPTION OF EMBODIMENTS

The following describes the embodiments of this application with reference to the accompanying drawings in the embodiments of this application.

During a folding process of an existing foldable electronic device, a bending position of a flexible display is easily squeezed by a support member, which creases the flexible display, and even causes damage to the flexible display, affecting service life of the flexible display. A rotating mechanism and a foldable electronic device provided in the embodiments of this application can prevent a bending position of a flexible display from being squeezed, which helps to prolong service life of the display.

Figure 1:
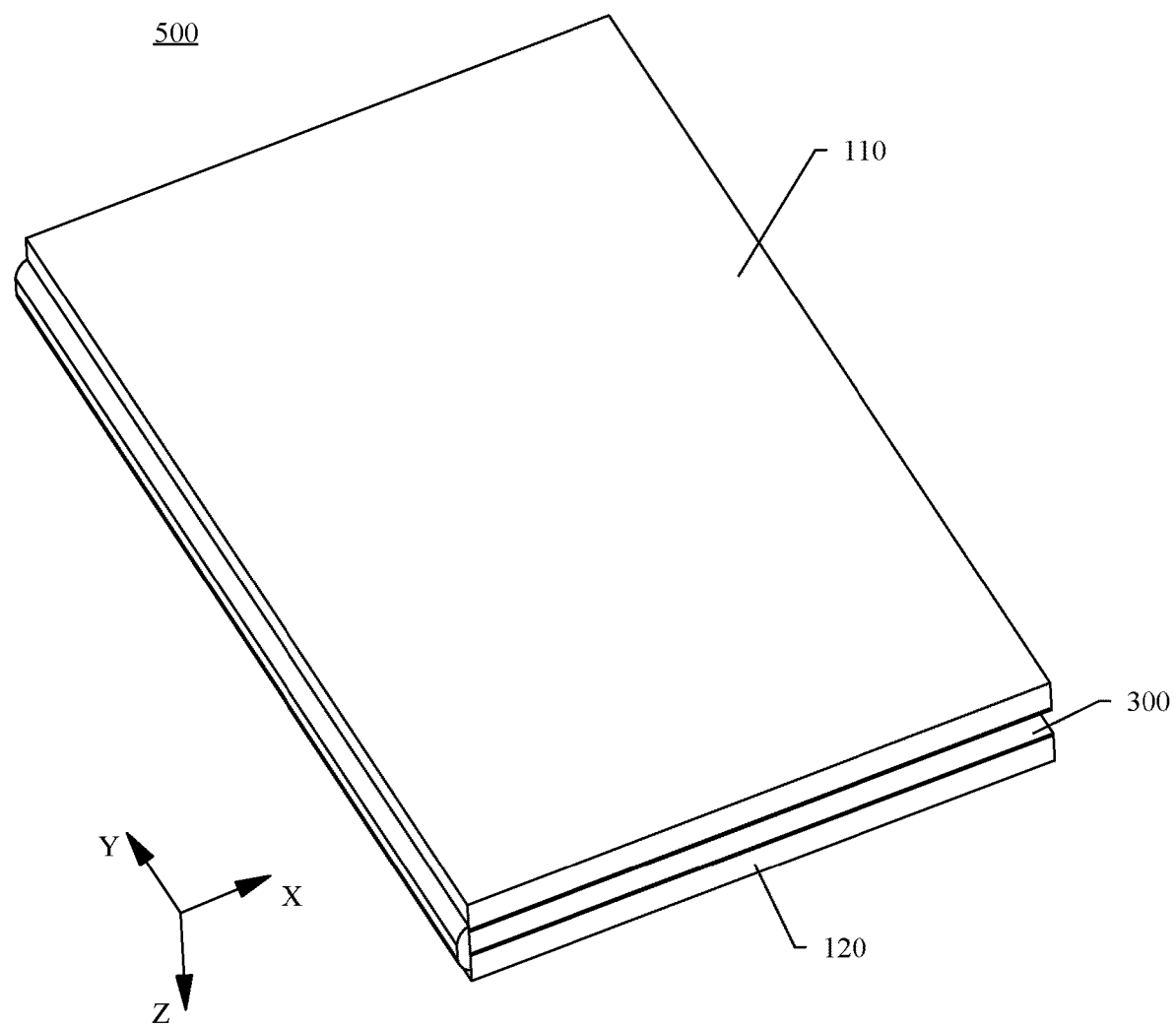
FIG. 1 is a schematic diagram of a structure of a foldable electronic device in a first state according to an embodiment of this application.
Figure 2:
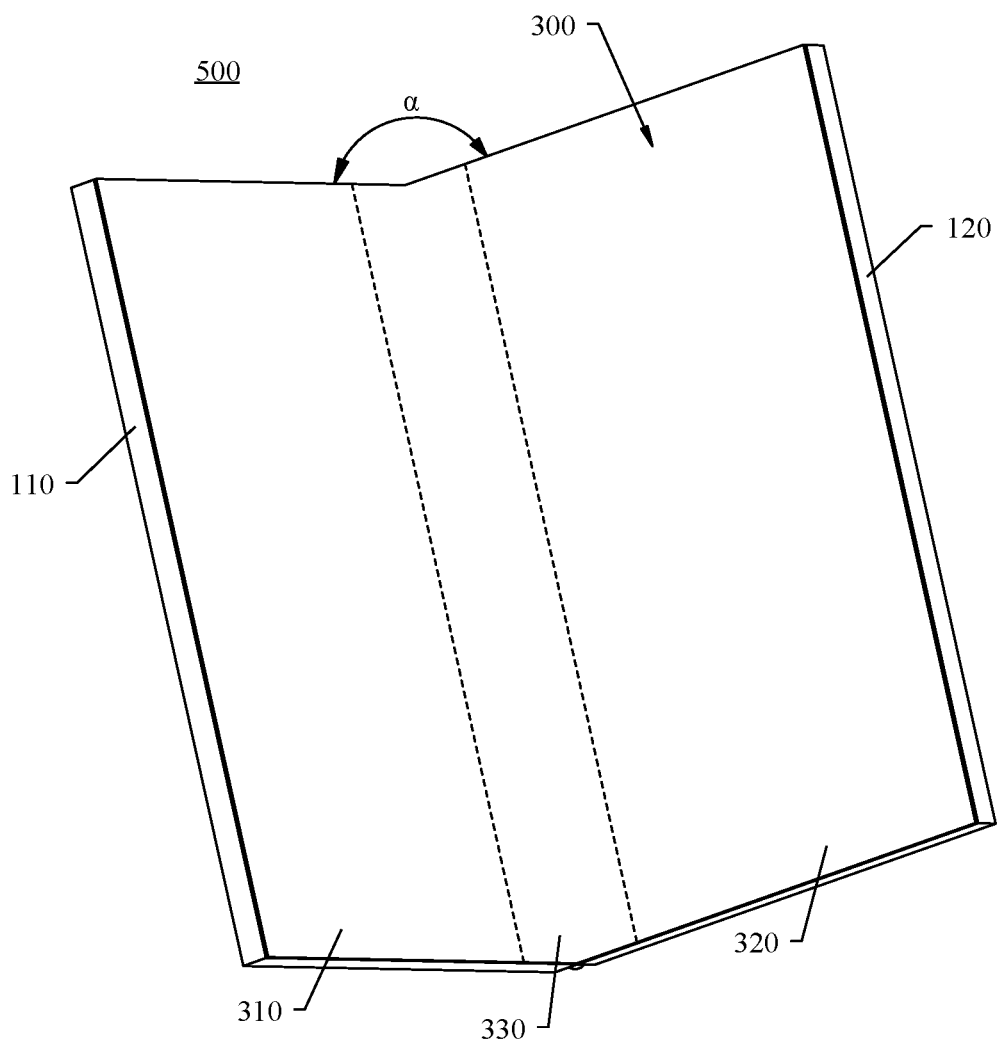
FIG. 2 is a schematic diagram of a structure of a foldable electronic device in a second state according to an embodiment of this application.
Figure 3:
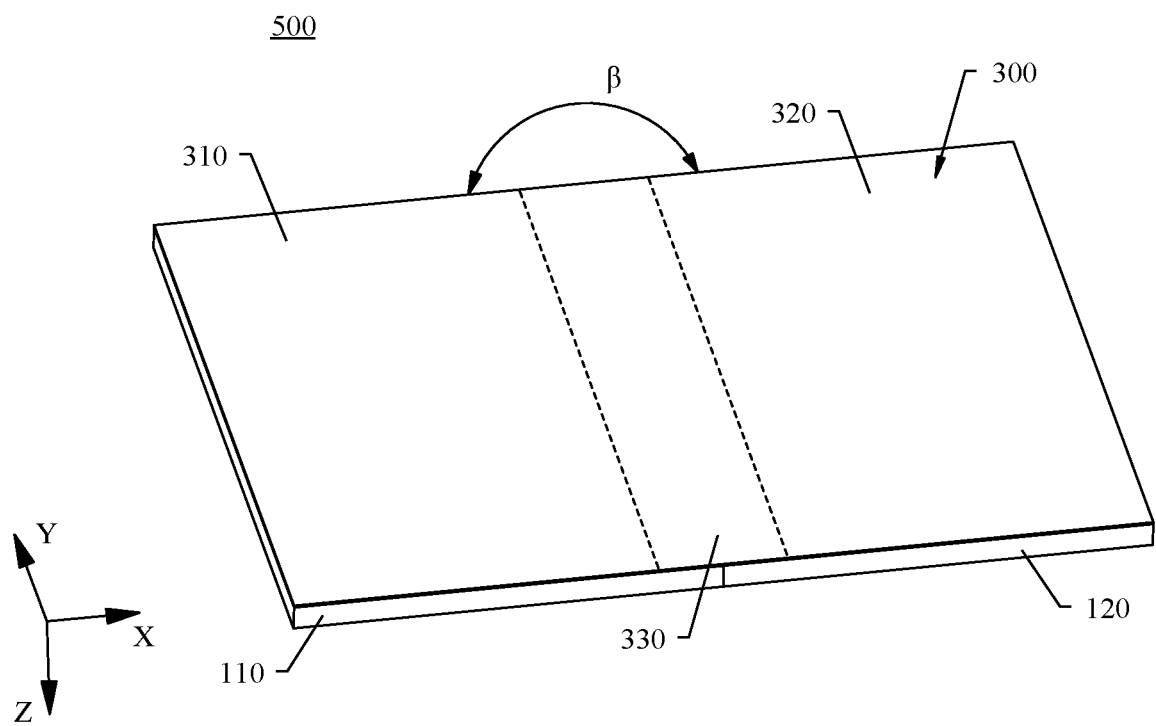
FIG. 3 is a schematic diagram of a structure of a foldable electronic device in a third state according to an embodiment of this application.

Refer to FIG. 1 to FIG. 3. FIG. 1 is a schematic diagram of a structure of a foldable electronic device 500 in a first state according to an embodiment of this application. FIG. 2 is a schematic diagram of a structure of a foldable electronic device 500 in a second state according to an embodiment of this application. FIG. 3 is a schematic diagram of a structure of a foldable electronic device 500 in a third state according to an embodiment of this application.

For ease of description, a width direction of the foldable electronic device 500 is defined as an X direction, a length direction of the foldable electronic device 500 is defined as a Y direction, and a thickness direction of the foldable electronic device 500 is defined as a Z direction. The X direction, the Y direction, and the Z direction are perpendicular to each other.

The foldable electronic device 500 includes, but is not limited to, a cellphone (cellphone), a notebook computer (notebook computer), a tablet personal computer (tablet personal computer), a laptop computer (laptop computer), a personal digital assistant (personal digital assistant), a wearable device (wearable device), a vehicle-mounted device (mobile device), or the like. In this embodiment of this application, a mobile phone is used as an example of the foldable electronic device 500 for description.

The foldable electronic device 500 shown in FIG. 1 is in a folded state, the foldable electronic device 500 shown in FIG. 2 is in a half-unfolded state, and the foldable electronic device 500 shown in FIG. 3 is in an unfolded state. An unfolding angle α of the foldable electronic device 500 shown in FIG. 2 is 90 degrees, and an unfolding angle β of the foldable electronic device 500 shown in FIG. 3 is 180 degrees.

It should be noted that, the angles illustrated in this embodiment of this application are all allowed to have a slight error. For example, that the unfolding angle α of the foldable electronic device 500 shown in FIG. 2 is 90 degrees means that α may be 90 degrees, or may be around 90 degrees, such as 80 degrees, 85 degrees, 95 degrees, or 100 degrees. That the unfolding angle β of the foldable electronic device 500 shown in FIG. 3 is 180 degrees means that β may be 180 degrees, or around 180 degrees, such as 170 degrees, 175 degrees, 185 degrees, or 190 degrees. Angles illustrated subsequently as examples may be understood in a same way.

The foldable electronic device 500 shown in this embodiment of this application is an electronic device that can be folded once. In some other embodiments, the foldable electronic device 500 may alternatively be an electronic device that can be folded a plurality of times (twice or more). In this case, the foldable electronic device 500 may include a plurality of parts, two adjacent parts may be folded relatively close to each other until the foldable electronic device 500 is in the folded state, and two adjacent parts may be unfolded relatively far away from each other until the foldable electronic device 500 is in the unfolded state.

Figure 4:
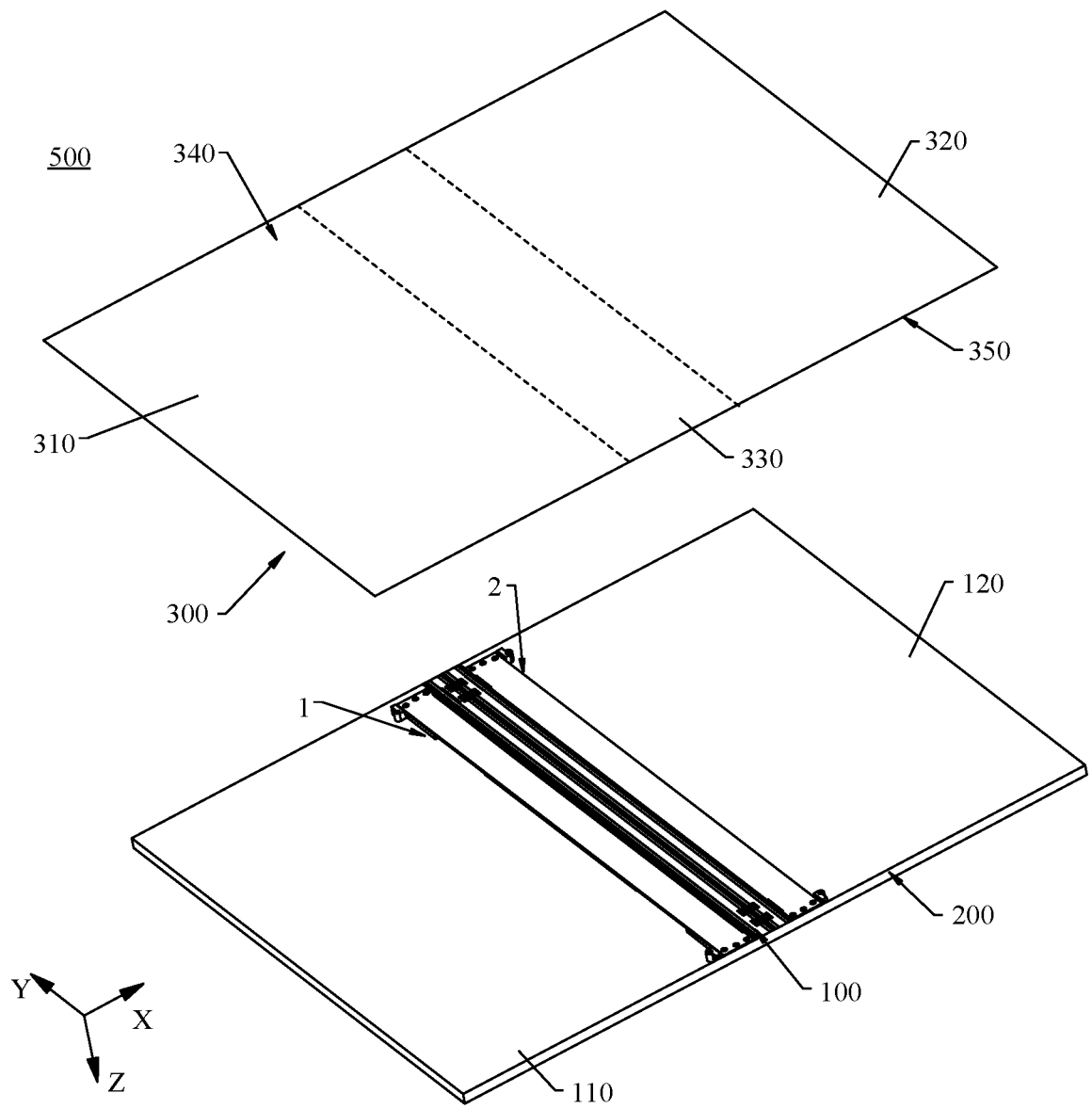
FIG. 4 is a schematic exploded view of a structure of the foldable electronic device shown in FIG. 3.

Refer to FIG. 4. FIG. 4 is a schematic exploded view of a structure of the foldable electronic device 500 shown in FIG. 3.

The foldable electronic device 500 includes a foldable apparatus 200 and a display 300, and the display 300 is installed on the foldable apparatus 200. The display 300 includes a display surface 340) and an installation surface 350, and the display surface 340 and the installation surface 350 are disposed opposite to each other. The display surface 340 is configured to display text, an image, a video, and the like. The display 300 includes a first display part 310, a second display part 320, and a foldable part 330. The foldable part 330 is located between the first display part 310 and the second display part 320, and the foldable part 330 may be bent along the Y direction. In this embodiment, the display 300 uses a flexible display, such as an organic light-emitting diode (organic light-emitting diode, OLED) display, an active matrix organic light emitting diode or active matrix organic light-emitting diode (active matrix organic light-emitting diode, AMOLED) display, a mini organic light-emitting diode (mini organic light-emitting diode) display, a micro organic light-emitting diode (micro organic light-emitting diode) display, or a quantum dot light-emitting diodes (quantum dot light-emitting diode, QLED) display.

The foldable apparatus 200 includes a first casing 110, a second casing 120, and a rotating mechanism 100. The first casing 110 is provided with a first installation groove 1, and the second casing 120 is provided with a second installation groove 2. The first installation groove 1 and the second installation groove 2 are connected, to form an installation groove. The rotating mechanism 100 is installed in the installation groove and is fixedly connected to the first casing 110 and the second casing 120 to achieve a rotatable connection between the first casing 110 and the second casing 120. The first casing 110 and the second casing 120 may be rotated relative to each other by using the rotating mechanism 100, so that the foldable apparatus 200 may be switched between the folded state and the unfolded state.

That the relative rotation of the first casing 110 and the second casing 120 enables the foldable apparatus 200 to be in the folded state means that the first casing 110 and the second casing 120 are rotated by using the rotating mechanism 100 and approach each other, and surfaces, carrying the display 300, of the first casing 110 and the second casing 120 are opposite to each other. Actually, during application, when the foldable apparatus 200 is in a completely folded state, after the display 300 installed on the first casing 110 and the second casing 120 is folded, a display surface 340 of the display 300 located on the first display part 310 and a display surface 340 located on the second display part 320 are partially in contact, and certainly, may be completely in contact. That the relative rotation of the first casing 110 and the second casing 120 enables the foldable apparatus 200 to be in the half-unfolded state means that the first casing 110 and the second casing 120 are rotated by using the rotating mechanism 100 and get away from each other, and an included angle between the first casing 110 and the second casing 120 becomes larger, and may be close to 90 degrees or equal to 90 degrees. That the relative rotation of the first casing 110 and the second casing 120 enables the foldable apparatus 200 to be in the unfolded state means that the first casing 110 and the second casing 120 are rotated by using the rotating mechanism 100 and get away from each other, and the included angle between the first casing 110 and the second casing 120 further increases, and may be close to 180 degrees or equal to 180 degrees.

The first casing 110, the second casing 120, and the rotating mechanism 100 are arranged sequentially along the X direction, and a sum of dimensions between three of them is a dimension of the foldable apparatus 200 in the X direction (including assembly tolerances and assembly gaps between three of them). The dimension of the foldable apparatus 200 in the X direction is the same as dimensions of the display 300 and the electronic device in the X direction, and certainly, includes an allowed tolerance range. Dimensions of the first casing 110, the second casing 120, and the rotating mechanism 100 along the Y direction are the same, and the dimensions may allow for assembly or production tolerances. The dimensions of the first casing 110, the second casing 120, and the rotating mechanism 100 in the Y direction are a dimension of the foldable apparatus 200 in the Y direction. The dimension of the foldable apparatus 200 in the Y direction is the same as dimensions of the display 300 and the electronic device in the Y direction, and certainly, allows for small deviations (assembly and production tolerances). The display 300 is installed on the foldable apparatus 200, and the installation surface 350 is fixedly connected to the foldable apparatus 200. Specifically, the first casing 110 carries the first display part 310, and the second casing 120 carries the second display part 320. In other words, the first display part 310 is installed on the first casing 110, and the second display part 320 is installed on the second casing 120. The rotating mechanism 100 is disposed opposite to the foldable part 330.

With reference to FIG. 1, the first casing 110 and the second casing 120 are rotated relative to each other by using the rotating mechanism 100, and the first casing 110 and the second casing 120 approach each other to drive the display 300 to be folded, so that the foldable electronic device 500 is folded. When the foldable electronic device 500 is in the folded state, the foldable part 330 of the display 300 is bent, and the first display part 310 and the second display part 320 are disposed opposite to each other. In this case, the display 300 is located between the first casing 110 and the second casing 120, and an exposed area of the display 300 is small, which can greatly reduce a probability of damage to the display 300 and achieve effective protection of the display 300.

Refer to FIG. 2 and FIG. 4 together. The first casing 110 and the second casing 120 are rotated relative to each other by using the rotating mechanism 100, and the first casing 110 and the second casing 120 get away from each other to drive the display 300 to be unfolded, so that the foldable electronic device 500 is unfolded to the half-unfolded state. When the foldable electronic device 500 is in the half-unfolded state, the first casing 110 and the second casing 120 are unfolded to have an included angle $\alpha$, the first display part 310 and the second display part 320 are unfolded relative to each other, and the foldable part 330 is driven to be unfolded. In this case, the included angle between the first display part 310 and the second display part 320 is $\alpha$. In this embodiment, $\alpha$ is 90 degrees. In other embodiments, a may alternatively be approximately 90 degrees, and may be 80 degrees, 85 degrees, 95 degrees, 100 degrees, or the like.

Refer to FIG. 3 and FIG. 4 together. The first casing 110 and the second casing 120 are rotated relative to each other by using the rotating mechanism 100, and the first casing 110 and the second casing 120 get away from each other to drive the display 300 to be further unfolded until the foldable electronic device 500 is flattened. When the foldable apparatus 200 is in the unfolded state, the included angle between the first casing 110 and the second casing 120 is $\beta$. The foldable part 330 is flattened, and the first display part 310 and the second display part 320 are unfolded relative to each other. In this case, included angles between the first display part 310, the second display part 320, and the foldable part 330 are all $\beta$, and the display 300 has a large display area, to achieve large-screen display of the foldable electronic device 500, thereby improving use experience of a user. In this embodiment, $\beta$ is 180 degrees. In other embodiments, $\beta$ may alternatively be approximately 180 degrees, and may be 170 degrees, 175 degrees, 185 degrees, 190 degrees, or the like.

Figure 5:
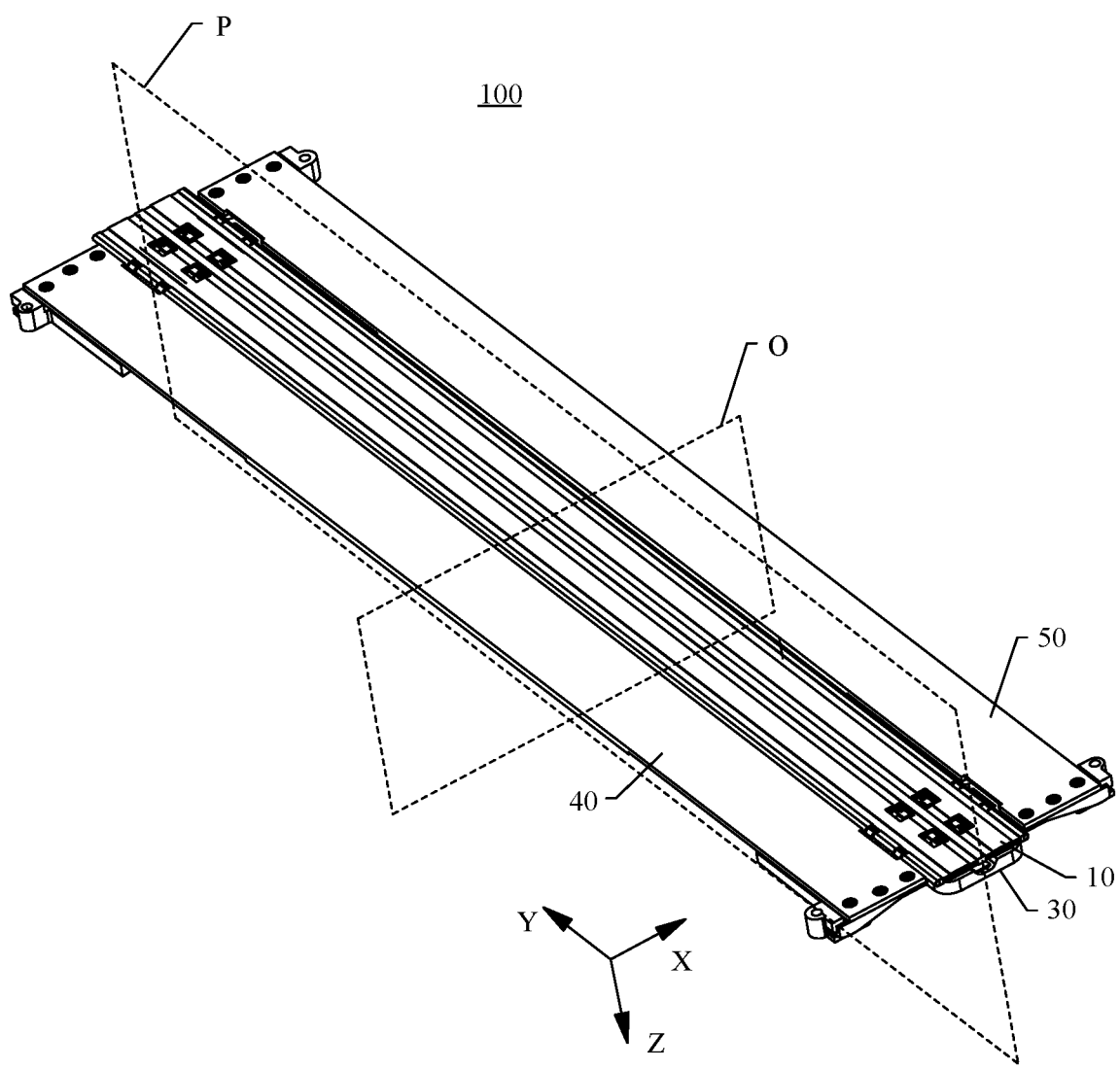
FIG. 5 is a schematic diagram of a rotating mechanism in the foldable electronic device shown in FIG. 4.

Refer to FIG. 5. FIG. 5 is a schematic diagram of a structure of a rotating mechanism 100 in the foldable electronic device 500 shown in FIG. 4.

For ease of description, a first reference plane O and a second reference plane P are set in this application. The first reference plane O is perpendicular to the Y direction, and the second reference plane P is perpendicular to the X direction. Actually, the first reference plane O and the second reference plane P are planes of symmetry of the rotating mechanism 100, where the rotating mechanism 100 is symmetric with respect to the first reference plane O and the second reference plane P.

Figure 6:
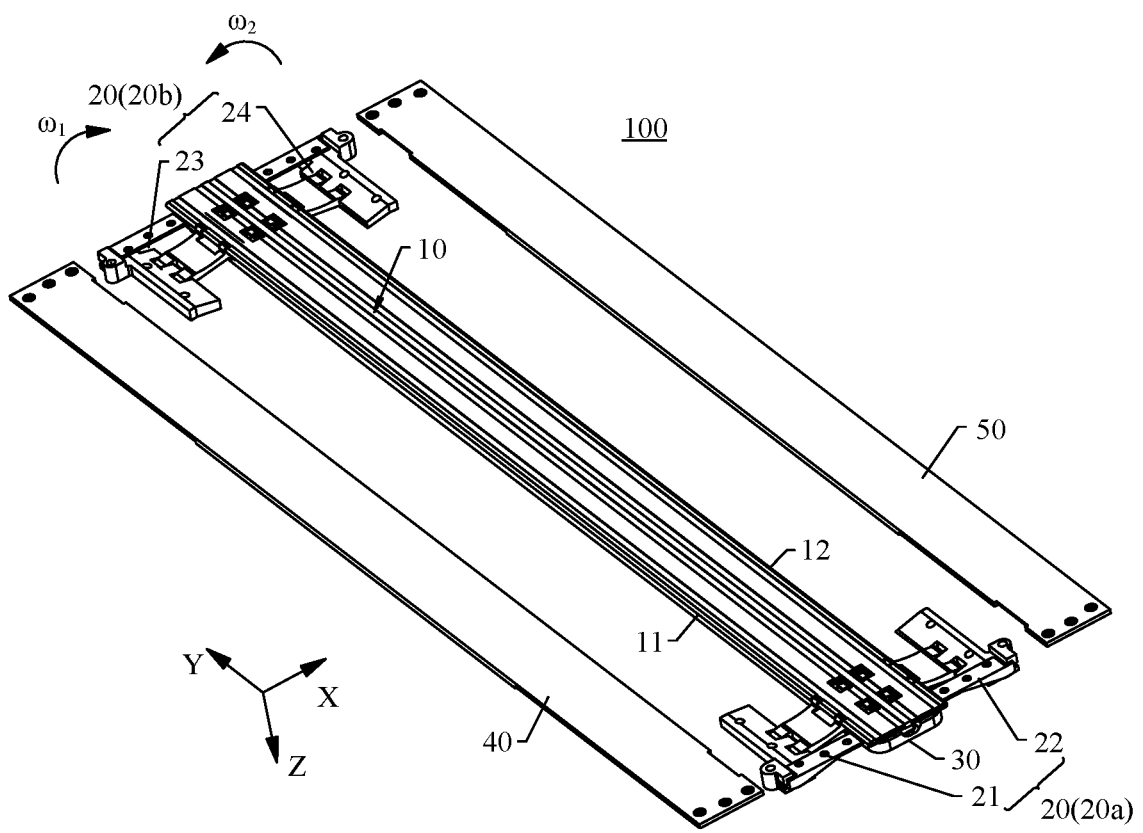
FIG. 6 is a schematic exploded view of a structure of the rotating mechanism shown in FIG. 5.
Figure 7:
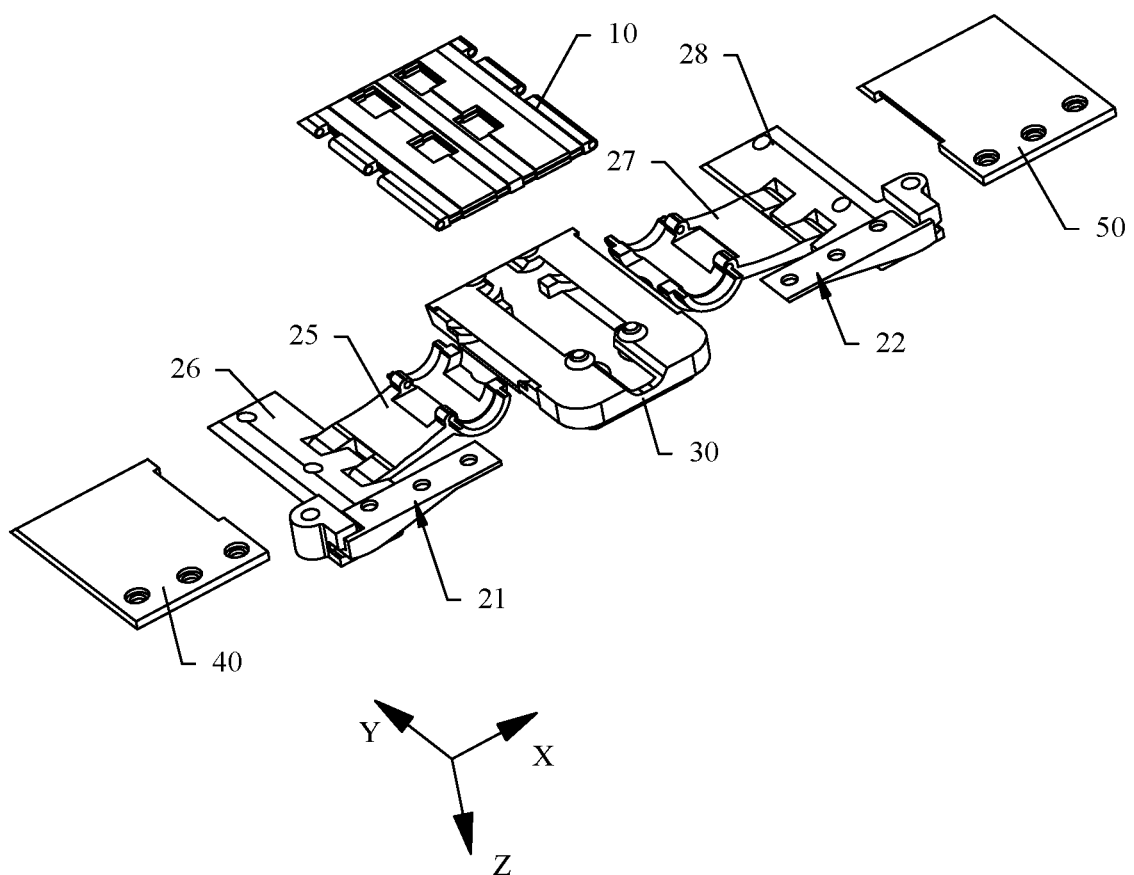
FIG. 7 is a schematic exploded view of a part of a structure of the rotating mechanism shown in FIG. 5.

Refer to FIG. 6 and FIG. 7 together. FIG. 6 is a schematic exploded view of a structure of the rotating mechanism 100 shown in FIG. 5. FIG. 7 is a schematic exploded view of a part of a structure of the rotating mechanism 100 shown in FIG. 5.

The rotating mechanism 100 includes a flexible support member 10, a rotating assembly 20, a fixed base 30, a first door panel 40, and a second door panel 50. Dimensions of the flexible support member 10, the fixed base 30, the first door panel 40, and the second door panel 50 along the Y direction are the same as the dimension of the electronic device along the Y direction, and certainly, allow for small deviations. In this embodiment, the flexible support member 10 is a rectangular plate-like structure, and the flexible support member 10 includes a first side portion 11 and a second side portion 12. The first side portion 11 and the second side portion 12 are disposed opposite to each other, and extending directions of the first side portion 11 and the second side portion 12 are both parallel to the Y direction. The flexible support member 10 is installed on a surface of the fixed base 30, and the fixed base 30, the first side portion 11, and the second side portion 12 are configured to connect to the rotating assembly 20 so as to achieve connection between the rotating assembly 20 and the fixed base 30. In addition, the rotating assembly 20 is further connected to the first door panel 40 and the second door panel 50 so as to achieve connection between the fixed base 30 and the first door panel 40 and second door panel 50.

There are two rotating assemblies 20 in this embodiment. The two rotating assemblies 20 are a first rotating assembly 20a and a second rotating assembly 20b, respectively. The first rotating assembly 20a and the second rotating assembly 20b are spaced from each other along the Y direction, and are specifically located at two opposite ends of a length direction of the flexible support member 10. The first rotating assembly 20a is located on a side facing a negative direction of the Y-axis relative to the second rotating assembly 20b. The first rotating assembly 20a and the second rotating assembly 20b are symmetric with respect to the first reference plane O. The first rotating assembly 20a includes a first rotating member 21 and a second rotating member 22. The first rotating member 21 is connected to the first side portion 11 of the flexible support member 10, the second rotating member 22 is connected to the second side portion 12 of the flexible support member 10, and the first rotating member 21 and the second rotating member 22 are symmetric with respect to the second reference plane P. The first rotating member 21 and the second rotating member 22 are installed on the fixed base 30, and the first rotating member 21 and the second rotating member 22 can rotate relative to the fixed base 30 so as to drive the flexible support member 10 to be bent or unfolded. The second rotating assembly 20b includes a third rotating member 23 and a fourth rotating member 24. The third rotating member 23 is connected to the first side portion 11 of the flexible support member 10, the fourth rotating member 24 is connected to the second side portion 12 of the flexible support member 10, and the third rotating member 23 and the fourth rotating member 24 are symmetric with respect to the second reference plane P. The third rotating member 23 and the fourth rotating member 24 are installed on the fixed base 30, and the third rotating member 23 and the fourth rotating member 24 can rotate relative to the fixed base 30 so as to drive the flexible support member 10 to be bent or unfolded.

In some other embodiments, there may alternatively be one, three, or more than three rotating assemblies 20, and a quantity of the rotating assemblies 20 is not specifically limited in this embodiment of this application.

The first door panel 40 and the second door panel 50 are rectangular plate-like structures. In addition, the dimensions of the first door panel 40 and the second door panel 50 along the Y direction are the same as the dimension of the fixed base 30 along the Y direction, and certainly, allow for small deviations. The first door panel 40 is installed on the first rotating member 21 and the third rotating member 23 and is fixedly connected to the first rotating member 21 and the third rotating member 23. The second door panel 50 is installed on the second rotating member 22 and the fourth rotating member 24 and is fixedly connected to the second rotating member 22 and the fourth rotating member 24.

Rotation directions of the first rotating member 21 and the third rotating member 23 are the same, and rotation directions of the second rotating member 22 and the fourth rotating member 24 are the same. Rotation directions of the first rotating member 21 and the second rotating member 22 relative to the fixed base 30 are opposite. Rotation directions of the third rotating member 23 and the fourth rotating member 24 relative to the fixed base 30 are opposite. For example, when the first door panel 40 and the second door panel 50 are rotated in directions of approaching each other to be folded relative to each other, the first rotating member 21 and the third rotating member 23 are rotated clockwise (in a direction of ω1 in shown in the figure) relative to the fixed base 30, the second rotating member 22 and the fourth rotating member 24 are rotated counterclockwise (in a direction of ω2 shown in the figure) relative to the fixed base 30, and the flexible support member 10 is bent. Alternatively, when the first door panel 40 and the second door panel 50 are rotated in directions of getting away from each other to be unfolded relative to each other, the first rotating member 21 and the third rotating member 23 are rotated counterclockwise relative to the fixed base 30, and the second rotating member 22 and the fourth rotating member 24 are rotated clockwise relative to the fixed base 30, and the flexible support member 10 is unfolded.

Figure 8:
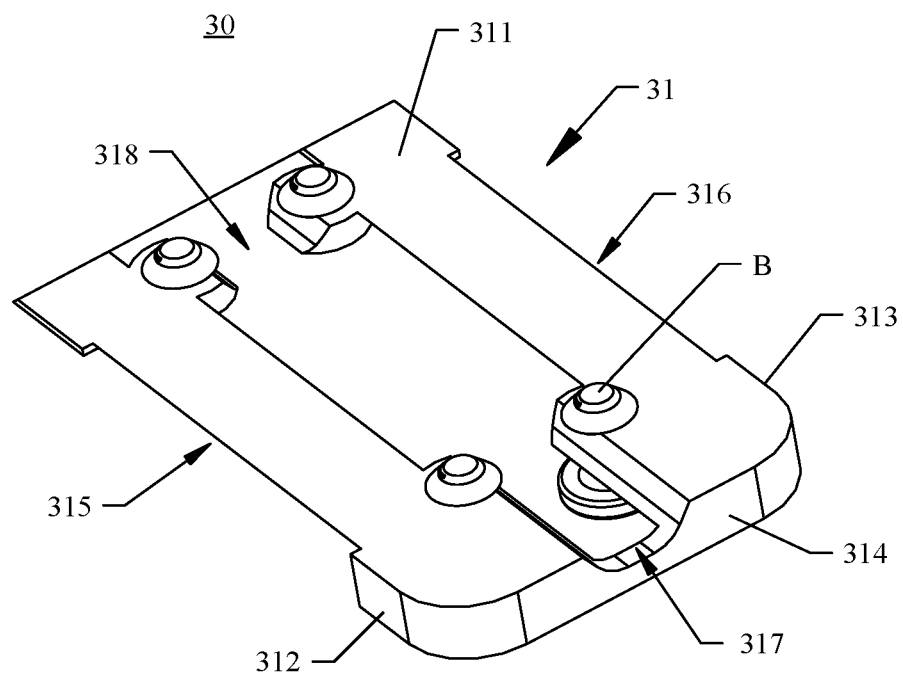
FIG. 8 is a schematic exploded view of a part of a structure of a fixed base in the rotating mechanism shown in FIG. 7.
Figure 8:
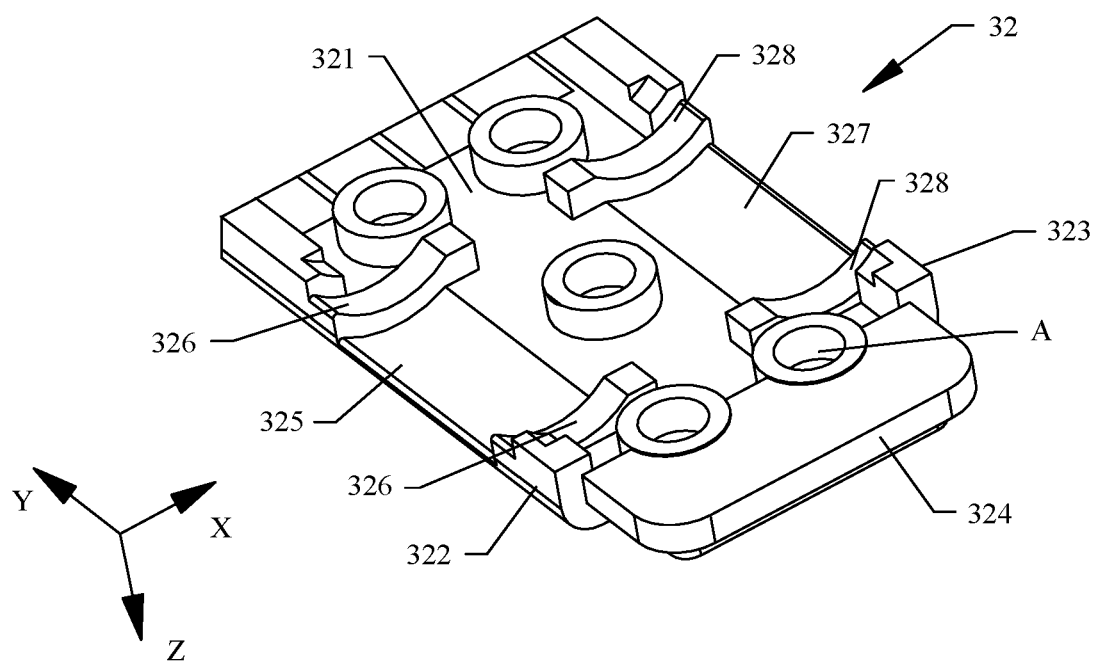

Refer to FIG. 8. FIG. 8 is a schematic exploded view of a part of a structure of a fixed base 30 in the rotating mechanism 100 shown in FIG. 7.

The fixed base 30 includes an upper casing 31 and a lower casing 32. The upper casing 31 and the lower casing 32 are disposed to be stacked and fixedly connected. The lower casing 32 includes a bottom plate 321, a first side plate 322, a second side plate 323, a first end plate 324, and a second end plate (not shown). The first side plate 322 and the second side plate 323 are disposed opposite to each other, and the first side plate 322 and the second side plate 323 are respectively connected to two opposite sides of the bottom plate 321 in the X direction. The first end plate 324 is opposite to the second end plate, and both the first end plate 324 and the second end plate are connected between the first side plate 322 and the second side plate 323, and are respectively connected to two opposite sides of the bottom plate 321 in the Y direction.

The bottom plate 321 is provided with a first rotating groove 325 and two first auxiliary rotating grooves 326. Bottom walls of the first rotating groove 325 and the two first auxiliary rotating grooves 326 are arc surfaces. One end of the first rotating groove 325 along the X direction penetrates through the first side plate 322 and is connected to the outside. The two first auxiliary rotating grooves 326 are respectively located on two opposite sides of the first rotating groove 325 in the Y direction, and the two first auxiliary rotating grooves 326 protrude from the bottom plate 321 in the Z direction. Extending directions of the two first auxiliary rotating grooves 326 are both the same as an extending direction of the first rotating groove 325.

The bottom plate 321 is further provided with a second rotating groove 327 and two second auxiliary rotating grooves 328. Structures of the second rotating groove 327 and the first rotating groove 325 are the same, and the second rotating groove 327 and the first rotating groove 325 are axially symmetric with respect to the second reference plane P. Structures of the two second auxiliary rotating grooves 328 and the two first auxiliary rotating grooves 326 are the same, and the two second auxiliary rotating grooves 328 and the two first auxiliary rotating grooves 326 are axially symmetric with respect to the second reference plane P. One end of the second rotating groove 327 along the X direction penetrates through the second side plate 323 and is connected to the outside. The two second auxiliary rotating grooves 328 are respectively located on two opposite sides of the second rotating groove 327 in the Y direction, and the two second auxiliary rotating grooves 328 protrude from the bottom plate 321 in the Z direction. Extending directions of the two second auxiliary rotating grooves 328 are both the same as an extending direction of the second rotating groove 327.

The lower casing 32 is further provided with a first bolt hole A. In this embodiment, there are a plurality of first bolt holes A located in the lower casing 32. In this embodiment, the first bolt hole A is located at the center of the bottom plate 321 in the X direction, and is located between the first rotating groove 325 and the second rotating groove 327. The first bolt hole A may also be located in the first end plate 324 or the second end plate. The first bolt hole A is configured to fixedly connect to the upper casing 31.

The upper casing 31 includes a top plate 311, a third side plate 312, a fourth side plate 313, a third end plate 314, and a fourth end plate. The third side plate 312 and the fourth side plate 313 are disposed opposite to each other, and the third side plate 312 and the fourth side plate 313 are respectively connected to two opposite sides of the top plate 311 in the X direction. The third end plate 314 and the fourth end plate are disposed opposite to each other, and the third end plate 314 and the fourth end plate are both located between the third side plate 312 and the fourth side plate 313 and respectively connected to two opposite sides of the top plate 311 in the Y direction.

The third side plate 312 is provided with a first notch 315. The first notch 315 penetrates through the third side plate 312 in the X direction and penetrates through a free end of the third side plate 312 in the Z direction. The fourth side plate 313 is provided with a second notch 316, the second notch 316 has a same structure as the first notch 315, and the second notch 316 and the first notch 315 are mirror-symmetric with respect to the second reference plane P. The second notch 316 penetrates through the fourth side plate 313 in the X direction, and penetrates through a free end of the fourth side plate 313 in the Z direction.

The top plate 311 is provided with a groove 317 and a first opening 318, and the groove 317 is symmetric with respect to the second reference plane P. An extending direction of the groove 317 is parallel to the Y direction, two ends of the groove 317 in the Y direction respectively penetrate through the third end plate 314 and the fourth end plate, and the groove 317 penetrates through the top plate 311 in the Z direction. The groove 317 is configured to provide bending space for the flexible support member 10. The first opening 318 is axially symmetric with respect to the second reference plane P, and the first opening 318 penetrates through the top plate 311 and is connected to the groove 317.

The upper casing 31 is further provided with a second bolt hole (not shown in the figure). Specifically; the second bolt hole of the upper casing 31 is located in the top plate 311 and is disposed corresponding to the first bolt hole A of the lower casing 32. A first bolt B is arranged in the second bolt hole of the upper casing 31, and the first bolt B passes through the second bolt hole located in the top plate 311 and the first bolt hole A located in the lower casing 32 and is connected to the lower casing 32, so that the upper casing 31 and the lower casing 32 are fixedly connected. In this case, the first notch 315 corresponds to one end, located on the first side plate 322, of the first rotating groove 325. The second notch 316 corresponds to one end, located on the second side plate 323, of the second rotating groove 327. The first notch 315 is used for the first rotating member 21 to extend into the first rotating groove 325 and to be able to rotate relatively in the first rotating groove 325. The second notch 316 is used for the second rotating member to extend into the second rotating groove 327 and to be able to rotate relatively in the second rotating groove 327.

Figure 9:
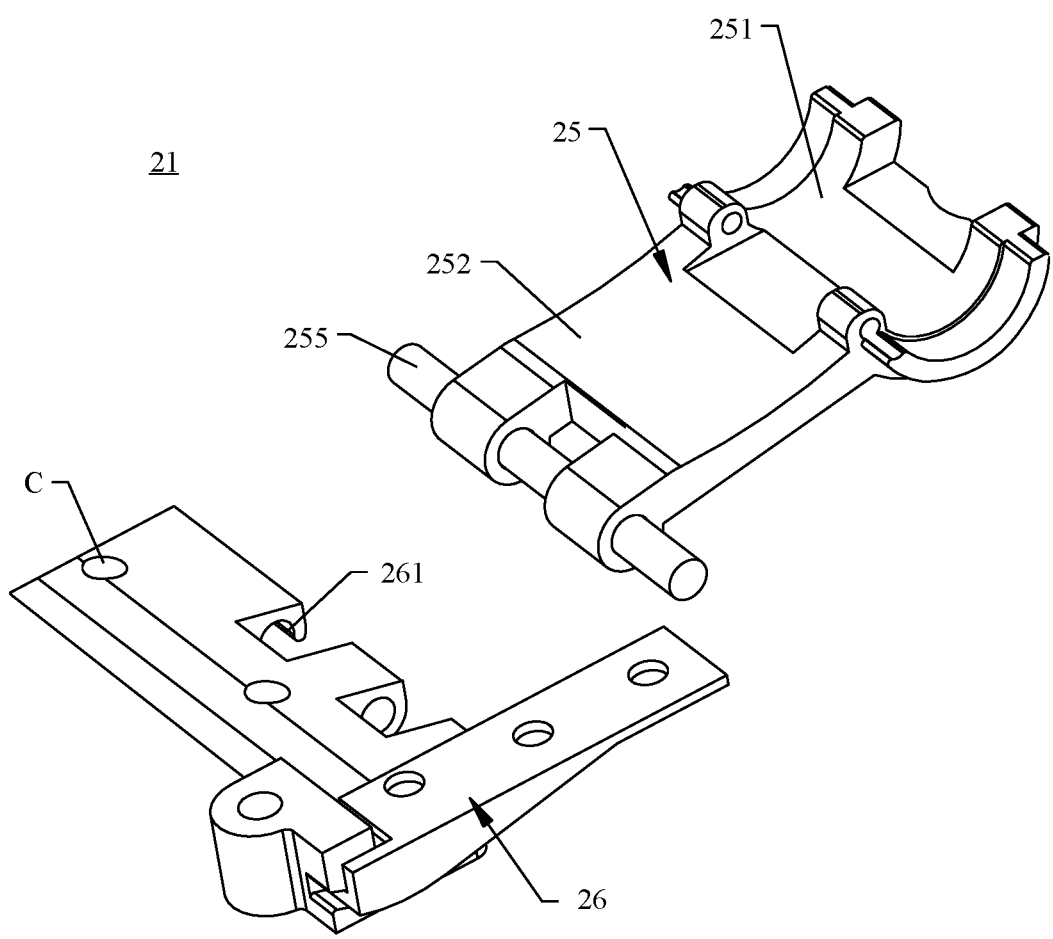
FIG. 9 is a schematic exploded view of a structure of a first rotating member in the rotating mechanism shown in FIG. 7.

Refer to FIG. 9. FIG. 9 is a schematic exploded view of a structure of a first rotating member 21 in the rotating mechanism 100 shown in FIG. 7.

The first rotating member 21 includes a first swingarm 25 and a first fixing plate 26. The first swingarm 25 is connected to the first fixing plate 26. Specifically, the first fixing plate 26 is provided with a first shaft hole 261, and an extending direction of the first shaft hole 261 is parallel to the Y direction. The first shaft hole 261 is configured to fixedly connect to the first swingarm 25. The first fixing plate 26 is provided with a third bolt hole C, the third bolt hole C located in the first fixing plate 26 penetrates through the first fixing plate 26 in the Z direction, and the third bolt hole C corresponds to a bolt hole located in the first door panel 40. A second bolt is arranged in the third bolt hole C, and the second bolt passes through the bolt hole located in the first door panel 40 and the third bolt hole C located in the first fixing plate 26 and is connected to the first fixing plate 26, so that the first door panel 40 is connected to the first fixing panel 26, and accordingly, the first swingarm 25 and the first door panel 40 can rotate relative to each other.

As shown in FIG. 7, a structure of the second rotating member 22 is the same as that of the first rotating member 21, and the second rotating member 22 and the first rotating member 21 are mirror-symmetric with respect to the second reference plane P. The second rotating member 22 includes a second swingarm 27 and a second fixing plate 28. The second swingarm 27 is connected to the second fixing plate 28. The second fixing plate 28 is provided with a second shaft hole, and an extending direction of the second shaft hole is parallel to the Y direction. The second shaft hole is configured to fixedly connect to the second swingarm 27. The second fixing plate 28 is provided with a bolt hole, the bolt hole located in the second fixing plate 28 penetrates through the second fixing plate 28 in the Z direction, and the bolt hole located in the second fixing plate 28 corresponds to a bolt hole located in the second door panel 50. A bolt is arranged in the bolt hole of the second fixing plate 28, and the bolt passes through the bolt hole located in the second door panel 50 and the bolt hole located in the second fixing plate 28 and is connected to the second fixing plate 28, so that the second door panel 50 is connected to the second fixing plate 28.

Figure 10:
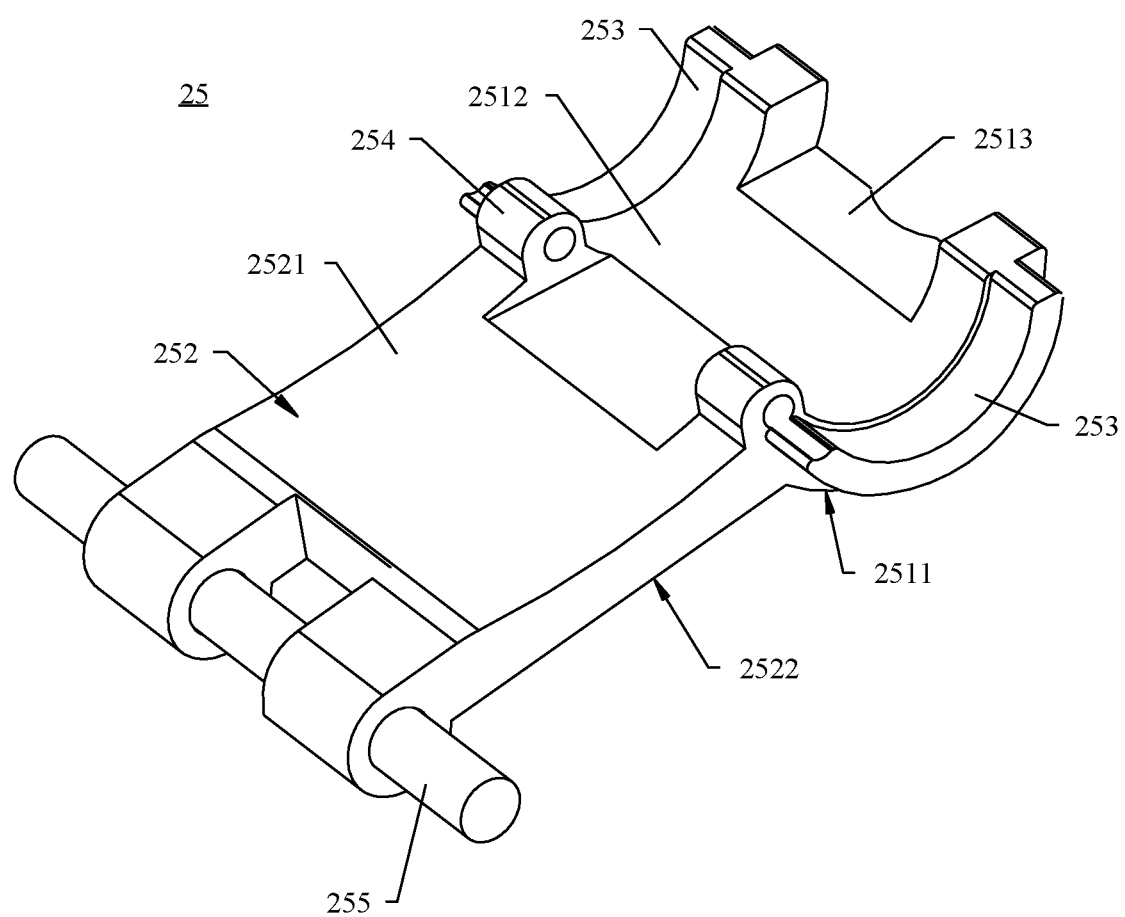
FIG. 10 is a schematic diagram of a structure of a first swingarm in the first rotating member shown in FIG. 9.

Refer to FIG. 9) and FIG. 10 together. FIG. 10 is a schematic diagram of a structure of a first swingarm 25 in the first rotating member 21 shown in FIG. 9.

The first swingarm 25 includes a first rotating body 251, a first swing portion 252, a first rotating portion 254, and a first rotating shaft 255. The first rotating body 251 is fixedly connected to the first swing portion 252. The first rotating body 251 is an arc plate-like structure. The first rotating body 251 includes an outer arc surface 2511 and an inner arc surface 2512, and the outer arc surface 2511 and the inner arc surface 2512 are disposed opposite to each other. One end of the first rotating body 251 is provided with a first avoidance groove 2513, and a groove opening is in an arc extending direction of the first rotating body 251. The first avoidance groove 2513 is configured to avoid the flexible support member 10 to prevent an end part of the first swingarm 25 from abutting against the flexible support member 10 to cause damage to the flexible support member 10 when the rotating mechanism 100 is in the unfolded state. The other end of the first rotating body 251 is fixedly connected to the first swing portion 252. The first rotating body 251 is configured to fit the first rotating groove 325. It should be noted that, that the first rotating body 251 fits the first rotating groove 325 means that a radius of the outer arc surface 2511 of the first rotating body 251 is the same as that of an arc surface of a bottom surface of the first rotating groove 325. The first rotating body 251 can slide in the first rotating groove 325 to achieve relative rotation of the first rotating body 251 and the fixed base 30. The "fit" mentioned subsequently may be understood in the same way.

The first swing portion 252 is in a flat plate-like shape. The first swing portion 252 includes an inner surface 2521 and an outer surface 2522, and the inner surface 2521 and the outer surface 2522 are disposed opposite to each other. The inner surface 2521 is connected to the inner arc surface 2512, and the outer surface 2522 is connected to the outer arc surface 2511.

The first rotating portion 254 is located in a connection position between the first rotating body 251 and the first swing portion 252. The first rotating portion 254 is disposed between and protrudes from the inner arc surface 2512 and the inner surface 2521. The first rotating portion 254 is provided with a connecting hole, and the connecting hole penetrates through the first rotating portion 254 along the Y direction. The first rotating portion 254 is configured to rotatably connect to the flexible support member 10, and the flexible support member 10 is driven to move by rotation of the first swingarm 25, so as to achieve bending or unfolding of the flexible support member 10.

The first rotating shaft 255 is located in one end, away from the first rotating body 251, of the first swing portion 252. An extending direction of the first rotating shaft 255 is parallel to the Y direction. The first rotating shaft 255 is connected to the first shaft hole 261 of the first fixing plate 26, so that when the first swingarm 25 rotates, the first fixing plate 26 can be driven to rotate, so as to drive the first door panel 40 to rotate, thereby achieving unfolding or folding of the first door panel 40.

The first swingarm 25 further includes a first auxiliary rotating body 253. In this embodiment, there are two first auxiliary rotating bodies 253, and the two first auxiliary rotating bodies 253 are respectively connected to two opposite sides of the first rotating body 251. The two first auxiliary rotating bodies 253 are both arc-shaped, and radians of the two first auxiliary rotating bodies 253 are the same as a radian of the first rotating body 251. The first auxiliary rotating bodies 253 respectively fit the first auxiliary rotating grooves 326. When the first swingarm 25 rotates relative to the fixed base 30, the first auxiliary rotating body 253 rotates in a corresponding first auxiliary rotating groove 326.

Refer to FIG. 7 as well. A structure of the second swingarm 27 in the second rotating member 22 is the same as a structure of the first swingarm 25. The second swingarm 27 includes a second rotating body, a second swing portion, a second rotating portion, and a second rotating shaft. The second rotating body is fixedly connected to the second swing portion. The second rotating body is an arc plate-like structure. The second rotating body includes an outer arc surface and an inner arc surface, and the outer arc surface and the inner arc surface are disposed opposite to each other. One end of the second rotating body is provided with a second avoidance groove, and a groove opening direction of the second avoidance groove is in an arc extending direction of the second rotating body. The second avoidance groove is configured to avoid the flexible support member 10 to prevent an end part of the second swingarm 27 from abutting against the flexible support member 10 to cause damage to the flexible support member 10 when the rotating mechanism 100 is in the unfolded state.

The other end of the second rotating body is fixedly connected to the second swing portion. The second rotating body is configured to fit the second rotating groove 327. The second swing portion is in a flat plate-like shape. The second swing portion includes an inner surface and an outer surface, and the inner surface and the outer surface are disposed opposite to each other. The inner surface is connected to the inner arc surface, and the outer surface is connected to the outer arc surface.

The second rotating portion is located in a connection position between the second rotating body and the second swing portion. The second rotating portion is disposed between and protrudes from the inner arc surface of the second rotating body and the inner surface of the second swing portion. The second rotating portion is provided with a connecting hole, and the connecting hole penetrates through the second rotating portion along the Y direction. The second rotating portion is configured to connect to the flexible support member 10, and the flexible support member 10 is driven to move by rotation of the second swingarm 27, so as to achieve bending or unfolding of the flexible support member 10.

The second rotating shaft is located in one end, facing away from the second rotating body; of the second swing portion. An extending direction of the second rotating shaft is parallel to the Y direction. The second rotating shaft is connected to the second shaft hole of the second fixing plate 28, so that when the second swingarm 27 rotates, the second fixing plate 28 can be driven to rotate, so as to drive the second door panel 50 to rotate, thereby achieving unfolding or folding of the second door panel 50.

The second swingarm 27 further includes a second auxiliary rotating body. In this embodiment, there are two second auxiliary rotating bodies, and the two second auxiliary rotating bodies are respectively connected to two opposite sides of the second rotating body. The two second auxiliary rotating bodies are both arc-shaped, and radians of the two second auxiliary rotating bodies are the same as a radian of the second rotating body. The second auxiliary rotating bodies respectively fit the second auxiliary rotating grooves 328.

Refer to FIG. 7, FIG. 8, and FIG. 10 together. The first swingarm 25 and the second swingarm 27 are both installed on the fixed base 30, and the first swingarm 25 and the second swingarm 27 are mirror-symmetric with respect to the second reference plane P. Specifically, the first rotating member 21 extends into the fixed base 30 from the first notch 315 by using an end, facing away from the first swing portion 252, of the first rotating body 251. The first rotating body 251 is installed in the first rotating groove 325, and the outer arc surface 2511 of the first rotating body 251 is in contact with a bottom wall of the first rotating groove 325. The two first auxiliary rotating bodies 253 are respectively installed in the two first auxiliary rotating grooves 326. The first swingarm 25 is rotatably installed on the first fixing plate 26 through the first rotating shaft 255, and the first fixing plate 26 is fixedly connected to the first door panel 40. When the first door panel 40 drives the first fixing plate 26 to rotate, the first fixing plate 26 drives the first swingarm 25 to rotate as a whole. In other words, both the first swingarm 25 and the first fixing plate 26 rotate relative to the fixed base 30. To be specific, the first swing portion 252 rotates relative to the fixed base 30 to drive the first rotating body 251 to rotate in the first rotating groove 325 in the X direction, and each of the first auxiliary rotating bodies 253 rotates in a corresponding first auxiliary rotating groove 326.

Likewise, the second rotating member 22 extends into the fixed base 30 from the second notch 316 by using an end, facing away from the second swing portion, of the second rotating body. The second rotating body is installed in the second rotating groove 327, and the outer arc surface of the second rotating body is in contact with a bottom wall of the second rotating groove 327. The two second auxiliary rotating bodies are respectively installed in the two second auxiliary rotating grooves 328. The second swingarm 27 is rotatably installed on the second fixing plate 28 through the second rotating shaft, and the second fixing plate 28 is fixedly connected to the second door panel 50. When the second door panel 50 drives the second fixing plate 28 to rotate, the second fixing plate 28 drives the second swingarm 27 to rotate as a whole. In other words, both the second swingarm 27 and the second fixing plate 28 rotate relative to the fixed base 30. To be specific, the second swing portion rotates relative to the fixed base 30 to drive the second rotating body to rotate in the second rotating groove 327 in the X direction, and each of the second auxiliary rotating bodies rotates in a corresponding second auxiliary rotating groove 328, thereby achieving folding of the rotating mechanism 100.

Refer to FIG. 6 and FIG. 7 together. Structures of the third rotating member 23 and the fourth rotating member 24 are the same as a structure of the first rotating member 21. Details are not described herein again. The third rotating member 23 and the first rotating member 21 are mirror-symmetric with respect to the first reference plane O. The fourth rotating member 24 and the second rotating member 22 are mirror-symmetric with respect to the first reference plane O. The third rotating member 23 and the fourth rotating member 24 rotate simultaneously with the first rotating member 21 and the second rotating member 22 to achieve relative rotation of the first door panel 40 and the second door panel 50.

Figure 11:
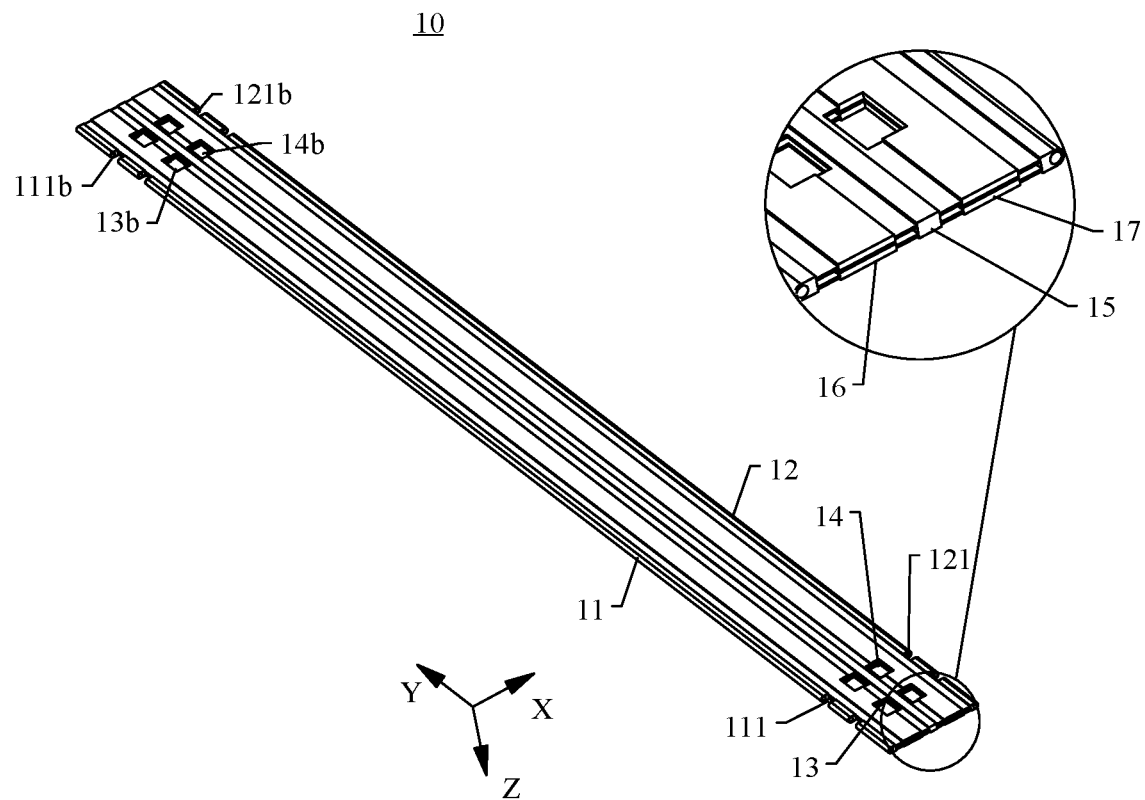
FIG. 11 is a schematic diagram of a structure of a flexible support member in the rotating mechanism shown in FIG. 5.

Refer to FIG. 11. FIG. 11 is a schematic diagram of a structure of a flexible support member 10 in the rotating mechanism 100 shown in FIG. 5.

The flexible support member 10 is a long bar-shaped plate-like structure. A dimension of the flexible support member 10 long the Y direction is the same as a dimension of the display 300 along the Y direction, and certainly, allows for small deviations (assembly and production tolerances). The flexible support member 10 includes a first side portion 11 and a second side portion 12. Extending directions of the first side portion 11 and the second side portion 12 are both parallel to the Y direction, and the first side portion 11 and the second side portion 12 are opposite to each other. The first side portion 11 is provided with a first rotating shaft hole 111, and the second side portion 12 is provided with a second rotating shaft hole 121. A first connecting shaft is arranged in the first rotating shaft hole 111, and a second connecting shaft is arranged in the second rotating shaft hole 121. The first connecting shaft is configured to rotatably connect to the first rotating portion 254 of the first swingarm 25. The second connecting shaft is configured to rotatably connect to the second rotating portion of the second swingarm 27. The first side portion 11 is further provided with a third rotating shaft hole 111$b$, and a third connecting shaft is arranged in the third rotating shaft hole 111$b$. The third rotating shaft hole 111$b$ and the first rotating shaft hole 111 are symmetric with respect to the first reference plane O, and the third connecting shaft is configured to connect to the third rotating member 23. The second side portion 12 is further provided with a fourth rotating shaft hole 121$b$, and a fourth connecting shaft is arranged in the fourth rotating shaft hole 121$b$. The fourth rotating shaft hole 121$b$ and the second rotating shaft hole 121 are symmetric with respect to the first reference plane O, and the fourth connecting shaft is configured to connect to the fourth rotating member 24.

The flexible support member 10 includes a rigid portion 15, a first bending portion 16, a second bending portion 17, the first side portion 11, and the second side portion 12. The first bending portion 16 and the second bending portion 17 are respectively connected to two opposite sides of the rigid portion 15 along the X direction, and the first bending portion 16 and the second bending portion 17 are symmetric with respect to the first rigid portion 15. One end, facing away from the rigid portion 15, of the first bending portion 16 is connected to the first side portion 11, and one end, facing away from the rigid portion 15, of the second bending portion 17 is connected to the second side portion 12. In other words, the first side portion 11, the first bending portion 16, the rigid portion 15, the second bending portion 17, and the second side portion 12 are sequentially connected.

In this embodiment, the first bending portion 16 and the second bending portion 17 include rigid sections and flexible sections. The rigid sections and the flexible sections are arranged at intervals. The rigid section and the rigid portion 15 are made of a rigid material, such as a metallic material. For example, both the rigid section and the rigid portion 15 are made of a material such as stainless steel, aluminum, or copper. The rigid section and the rigid portion 15 are not easily deformed, have relatively high strength, and have an effect of increasing strength of the flexible support member 10. The flexible section is made of a flexible material. In this embodiment, the flexible section is made of a rubber material. In other embodiments, the flexible section may alternatively be made of a thermoplastic elastomer or another flexible material. The flexible section made of a flexible material is prone to deformation under applied force.

Still refer to FIG. 11. The flexible support member 10 is provided with a first through-hole 13 and a second through-hole 14. Specifically, the first through-hole 13 is arranged in the first bending portion 16, and the first through-hole 13 penetrates through the first bending portion 16 in the Z direction. The second through-hole 14 is arranged in the second bending portion 17, and the second through-hole 14 penetrates through the second bending portion 17 in the Z direction. The first through-hole 13 and the second through-hole 14 are symmetric with respect to the second reference plane P. The first through-hole 13 and the first swingarm 25 are disposed opposite to each other. The second through-hole 14 and the second swingarm 27 are disposed opposite to each other. In this embodiment, there are two first through-holes 13, and the two first through-holes 13 are arranged at intervals side by side along the Y direction. There are two second through-holes 14, and the two second through-holes 14 are arranged at intervals side by side along the Y direction. In other embodiments, there may be one first through-hole 13 and one second through-hole 14. When the rotating mechanism 100 is in the unfolded state, an end part, facing away from the first swing portion 252, of the first swingarm 25 is accommodated in the first through-hole 13, so as to prevent the first swingarm 25 from abutting against the flexible support member 10 to cause damage to the flexible support member 10. When the rotating mechanism 100 is in the unfolded state, an end part, facing away from the second swing portion, of the second swingarm 27 is accommodated in the second through-hole 14, so as to prevent the second swingarm 27 from abutting against the flexible support member 10 to cause damage to the flexible support member 10.

The flexible support member 10 is further provided with a third through-hole 13b and a fourth through-hole 14b. The third through-hole 13b is located in a positive direction of a Y axis of the first through-hole 13, and the third through-hole 13b and the first through-hole 13 are symmetric with respect to the first reference plane O. The third through-hole 13b is configured to avoid the third rotating member 23, to avoid damage caused to the flexible support member 10 when the third rotating member 23 rotates relative to the fixed base 30. The fourth through-hole 14b is located in a positive direction of a Y-axis of the second through-hole 14, and the fourth through-hole 14b and the second through-hole 14 are symmetric with respect to the first reference plane O. The fourth through-hole 14b is configured to avoid the fourth rotating member 24, to avoid damage caused to the flexible support member 10 when the fourth rotating member 24 rotates relative to the fixed base 30.

Figure 12:
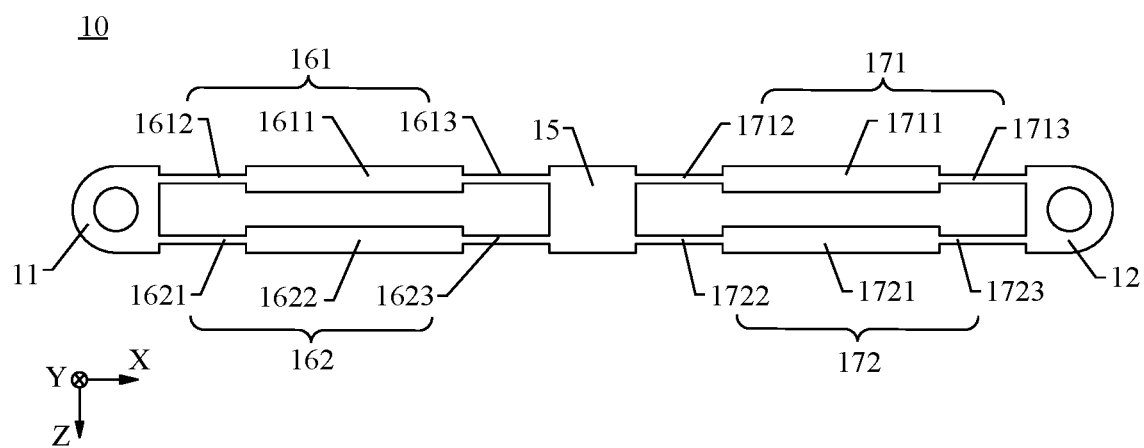
FIG. 12 is a schematic diagram of a structure of the flexible support member shown in FIG. 11 from another angle.

Refer to FIG. 12. FIG. 12 is a schematic diagram of a structure of the flexible support member 10) shown in FIG. 11 from another angle.

Specifically, the first bending portion 16 includes a first bending sub-portion 161 and a second bending sub-portion 162. The first bending sub-portion 161 and the second bending sub-portion 162 are arranged at intervals along the Z direction, and there is a gap between the first bending sub-portion 161 and the second bending sub-portion 162. The first bending sub-portion 161 includes a first rigid sub-section 1611, a first flexible sub-section 1612, and a second flexible sub-section 1613. The first flexible sub-section 1612 and the second flexible sub-section 1613 are respectively connected to two opposite ends of the first rigid sub-section 1611. One end, facing away from the first rigid sub-section 1611, of the first flexible sub-section 1612 is connected to the first side portion 11, and one end, facing away from the first rigid sub-section 1611, of the second flexible sub-section 1613 is connected to the rigid portion 15. The second bending sub-portion 162 includes a second rigid sub-section 1621, a third flexible sub-section 1622, and a fourth flexible sub-section 1623. The third flexible sub-section 1622 and the fourth flexible sub-section 1623 are respectively connected to two opposite ends of the second rigid sub-section 1621. The third flexible sub-section 1622 and the first flexible sub-section 1612 are opposite to each other. The fourth flexible sub-section 1623 and the second flexible sub-section 1613 are opposite to each other. The second rigid sub-section 1621 and the first rigid sub-section 1611 are opposite to each other. One end, facing away from the second rigid sub-section 1621, of the third flexible sub-section 1622 is connected to the first side portion 11, and one end, facing away from the second rigid sub-section 1621, of the fourth flexible sub-section 1623 is connected to the rigid portion 15.

The second bending portion 17 includes a third bending sub-portion 171 and a fourth bending sub-portion 172. The third bending sub-portion 171 and the fourth bending sub-portion 172 are arranged at intervals along the Z direction, and there is a gap between the third bending sub-portion 171 and the fourth bending sub-portion 172. The third bending sub-portion 171 includes a third rigid sub-section 1711, a fifth flexible sub-section 1712, and a sixth flexible sub-section 1713. The fifth flexible sub-section 1712 and the sixth flexible sub-section 1713 are respectively connected to two opposite ends of the third rigid sub-section 1711. One end, facing away from the third rigid sub-section 1711, of the fifth flexible sub-section 1712 is connected to the rigid portion 15, and one end, facing away from the third rigid sub-section 1711, of the sixth flexible sub-section 1713 is connected to the second side portion 12. The fourth bending sub-portion 172 includes a fourth rigid sub-section 1721, a seventh flexible sub-section 1722, and an eighth flexible sub-section 1723. The seventh flexible sub-section 1722 and the eighth flexible sub-section 1723 are respectively connected to two opposite ends of the fourth rigid sub-section 1721. The seventh flexible sub-section 1722 and the fifth flexible sub-section 1712 are opposite to each other. The eighth flexible sub-section 1723 and the sixth flexible sub-section 1713 are opposite to each other. The fourth rigid sub-section 1721 and the third rigid sub-section 1711 are opposite to each other. One end, facing away from the fourth rigid sub-section 1721, of the seventh flexible sub-section 1722 is connected to the rigid portion 15, and one end, facing away from the fourth rigid sub-section 1721, of the eighth flexible sub-section 1723 is connected to the second side portion 12.

Figure 13:
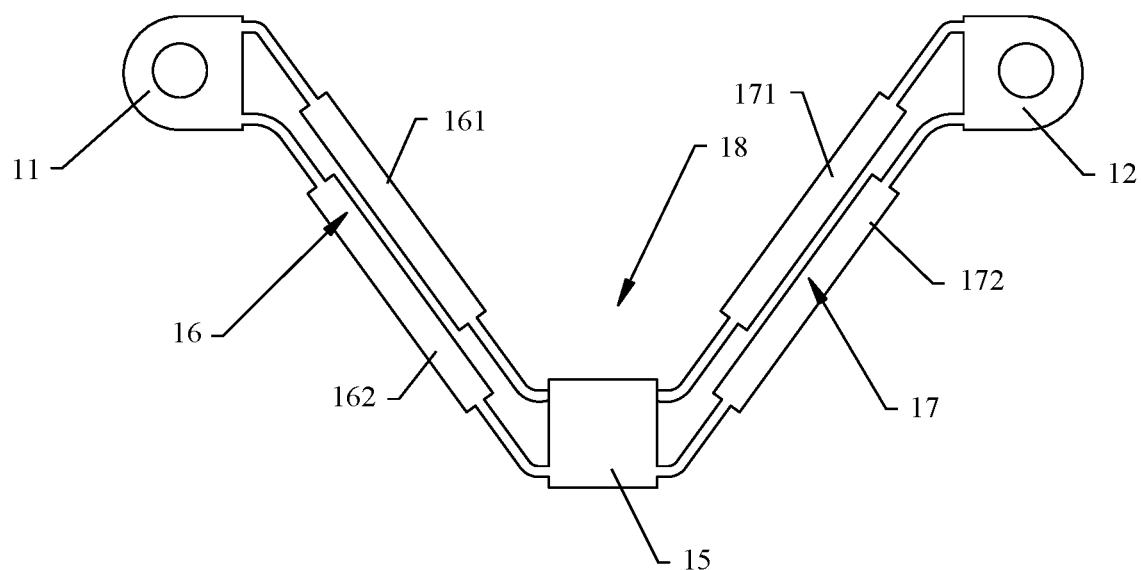
FIG. 13 is a schematic diagram of a structure of the flexible support member shown in FIG. 12 in another state.

Refer to FIG. 13 as well. FIG. 13 is a schematic diagram of a structure of the flexible support member 10 shown in FIG. 12 in another state.

When the flexible support member 10 is in a bent state, the second flexible sub-section 1613 of the first bending sub-portion 161 and the fourth flexible sub-section 1623 of the second bending sub-portion 162 are bent toward a same direction, and a gap is formed between the second flexible sub-section 1613 and the fourth flexible sub-section 1623. The first rigid sub-section 1611 and the second rigid sub-section 1621 remain unchanged in shape and are displaced in their extending directions. The first flexible sub-section 1612 of the first bending sub-portion 161 and the third flexible sub-section 1622 of the second bending sub-portion 162 are bent toward a same direction, and a gap is formed between the first flexible sub-section 1612 and the third flexible sub-section 1622. The sixth flexible sub-section 1713 of the third bending sub-portion 171 and the eighth flexible sub-section 1723 of the fourth bending sub-portion 172 are bent toward a same direction, and a gap is formed between the sixth flexible sub-section 1713 and the eighth flexible sub-section 1723. The third rigid sub-section 1711 and the fourth rigid sub-section 1721 remain unchanged in shape and are displaced in their extending directions. The fifth flexible sub-section 1712 of the third bending sub-portion 171 and the seventh flexible sub-section 1722 of the fourth bending sub-portion 172 are bent toward a same direction, and a gap is formed between the fifth flexible sub-section 1712 and the seventh flexible sub-section 1722.

In this embodiment, avoidance space 18 formed by bending of the flexible support member 10 is in a shape of a water drop, so that the shape of the avoidance space 18 better fits a shape formed by bending of the display 300, to further prevent the flexible support member 10 from squeezing the display 300 to cause damage to the display 300, and in addition, to avoid adverse phenomena such as creases on the display 300, thereby prolonging service life of the display 300.

In this embodiment, when the flexible support member 10 is in the bent state, the avoidance space 18 is formed, and the avoidance space 18 can provide bending space for the foldable part 330 of the display 300, so as to prevent the flexible support member 10 from being squeezed to cause damage to the display 300 when the foldable part 330 of the display 300 is bent. In addition, a round corner formed when the display 300 is bent can also be avoided, so that the foldable part 330 of the display 300 is not bent by a relatively large angle, to avoid adverse phenomena such as creases on the display 300, thereby prolonging service life of the display 300. Moreover, the flexible support member 10 can be bent, so that a dimension of the flexible support member 10) in the X direction in the bent state is reduced, so as to reduce thickness of the rotating mechanism 100, which facilitates thinning of the foldable electronic device 500.

The gap is disposed between the first bending sub-portion 161 and the second bending sub-portion 162 of the first bending portion 16, so that bending space can be provided for the first bending sub-portion 161 after the second bending sub-portion 162 is bent, to increase a bending degree of the first bending sub-portion 161. The gap is disposed between the third bending sub-portion 171 and the fourth bending sub-portion 172 of the second bending portion 17, so that bending space can be provided for the third bending sub-portion 171 after the fourth bending sub-portion 172 is bent, to increase a bending degree of the third bending sub-portion 171. In this way, the avoidance space 18 formed by the bending of the flexible support member 10 is further increased, bending space is further provided for the display 300, and the dimension of the flexible support member 10 in the Z direction in the folded state is further reduced.

Lengths and a ratio of the first bending portion 16, the second bending portion 17, and the rigid portion 15, and lengths or a ratio of the flexible sections and the rigid sections in the first bending portion 16 and the second bending portion 17, or quantities of flexible sections and rigid sections may be adjusted according to an actual requirement. In this way, a shape of the flexible support member 10 in the folded state varies, so that the flexible support member 10 can further fit a shape of the foldable part 330 of the display 300 in the bent state, to further provide bending space for the display 300, and avoid adverse phenomena such as creases on the display 300, thereby prolonging service life of the display 300.

In an implementation, a length ratio of the first bending portion 16, the second bending portion 17, and the rigid portion 15 is 1:1:1. The first bending portion 16 has two flexible sections and one rigid section, lengths of the two flexible sections are the same, and a length ratio of the rigid section to each flexible section is 2:1. The second bending portion 17 has two flexible sections and one rigid section, lengths of the two flexible sections are the same, and a length ratio of the rigid section to each flexible section is 2:1.

Refer to FIG. 6 as well. The flexible support member 10 is carried on the fixed base 30. The first rotating portion 254 of the first swingarm 25 is rotatably connected to the first connecting shaft of the flexible support member 10, and the second rotating portion of the second swingarm 27 is rotatably connected to the second connecting shaft of the flexible support member 10. When the first swingarm 25 and the second swingarm 27 rotate relative to the fixed base 30, the flexible support member 10 can be driven to switch between the bending state and the unfolding state.

Specifically, refer to FIG. 3 as well. When the foldable electronic device 500 is in the unfolded state, an included angle between the first door panel 40 and the second door panel 50 is $\beta$. $\beta$ is 180 degrees. The first rotating body 251 and the two first auxiliary rotating bodies 253 of the first swingarm 25 slide toward the fixed base 30 until the first rotating body 251 is accommodated in the first rotating groove 325, and the end part of the first swingarm 25 is exposed through the first through-hole 13. The second rotating body and the two second auxiliary rotating bodies of the second swingarm 27 slide toward the fixed base 30 until the second rotating body is accommodated in the second rotating groove 327, and the end part of the second swingarm 27 is exposed through the second through-hole 14. The flexible support member 10 is in a flattened state without being bent.

Figure 14:
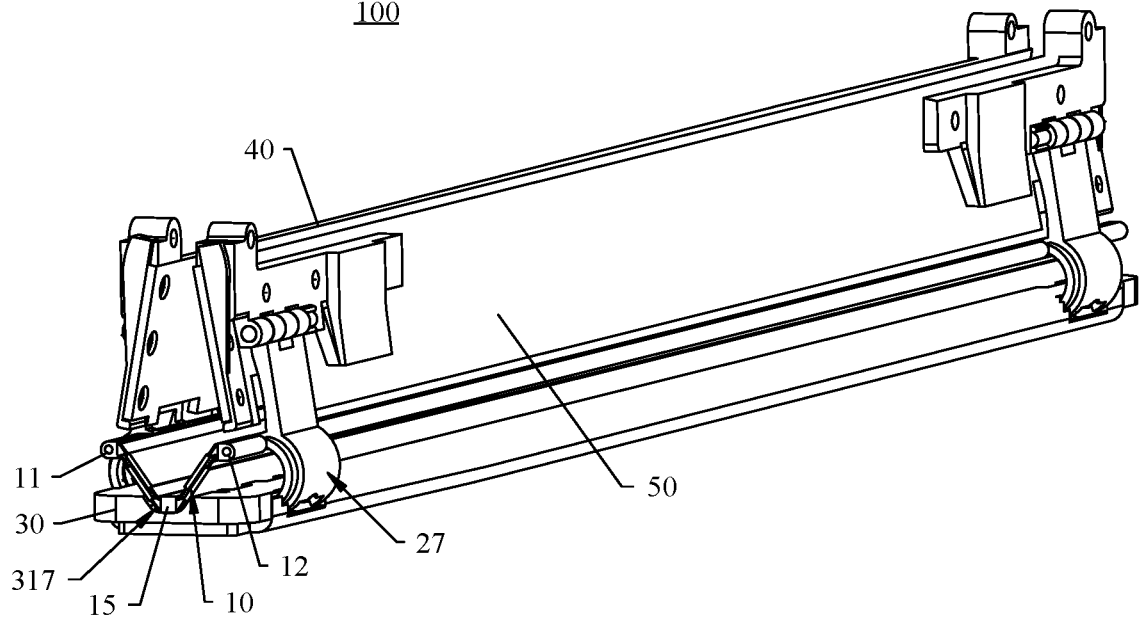
FIG. 14 is a schematic diagram of a structure of the rotating mechanism shown in FIG. 5 in a folded state.

Refer to FIG. 10 and FIG. 14 together. FIG. 14 is a schematic diagram of a structure of the rotating mechanism 100 shown in FIG. 5 in a folded state.

When the first door panel 40 and the second door panel 50 rotate in a direction of approaching each other, the first door panel 40 drives the first swingarm 25 to rotate clockwise through the first fixing plate 26, and the first rotating body 251 and the two first auxiliary rotating bodies 253 slide in a direction of getting away from the fixed base 30 to drive a part, close to the first side portion 11, of the flexible support member 10 to bend clockwise. The second door panel 50 drives the second swingarm 27 to rotate counterclockwise through the second fixing plate 28, and the second rotating body and the two second auxiliary rotating bodies slide in a direction of getting away from the fixed base 30 to drive a part, close to the second side portion 12, of the flexible support member 10 to bend counterclockwise. In addition, the second fixing plate 28 and the second door panel 50 are driven to rotate counterclockwise. In this case, the flexible support member 10 is in the bent state, the first door panel 40 and the second door panel 50 are folded relative to each other, and the rotating mechanism 100 is in the folded state.

Figure 15:
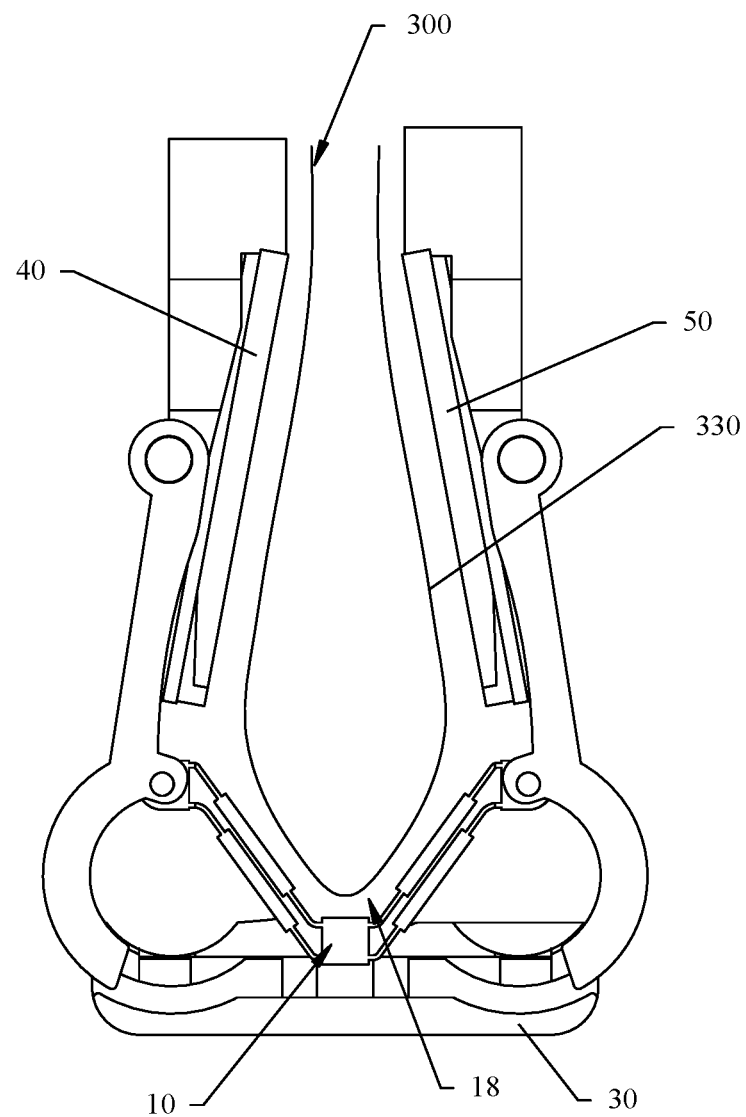
FIG. 15 is a schematic diagram of a partial structure of the foldable electronic device shown in FIG. 1.

Refer to FIG. 14 and FIG. 15. FIG. 15 is a schematic diagram of a partial structure of the foldable electronic device 500 shown in FIG. 1. The foldable electronic device 500 shown in FIG. 15 shows only the rotating mechanism 100 and the display 300.

When the foldable electronic device 500 is in the folded state, the flexible support member 10 is bent, the first side portion 11 and the second side portion 12 move in a direction of getting away from the fixed base 30, and the rigid portion 15 moves in a direction of approaching the fixed base 30 is accommodated in the groove 317 to form the avoidance space 18. The groove 317 provides space for bending of the flexible support member 10, so that the flexible support member 10 can be smoothly bent to form the avoidance space 18, and in addition, the fixed base 30 can be prevented from squeezing the flexible support member 10 to cause damage to the flexible support member 10. The foldable part 330 of the display 300 is located on an inner side of the rotating mechanism 100. The foldable part 330 is partially located between the first door panel 40 and the second door panel 50, and is spaced from the first door panel 40 and the second door panel 50, and the foldable part 330 is partially opposite to the flexible support member 10, and is located in the avoidance space 18. Bending of the flexible support member 10 can avoid a round corner formed when the foldable part 330 is bent, so that the foldable part 330 is not bent by a relatively large angle, to avoid adverse phenomena such as creases on the display 300, thereby prolonging service life of the display 300.

In addition, there is a gap between the display 300 and the flexible support member 10, so as to prevent the display 300 from being squeezed by the flexible support member 10 to cause damage to the display 300, and also prevent the flexible support member 10 from colliding with the display 300 in a reliability test to cause damage to the display 300. Moreover, the bendable flexible support member 10 is disposed, so that a dimension of the flexible support member 10 in the Z direction in the bent state is reduced, so as to reduce thickness of the rotating mechanism 100, which facilitates thinning of the foldable electronic device 500.

Figure 16:
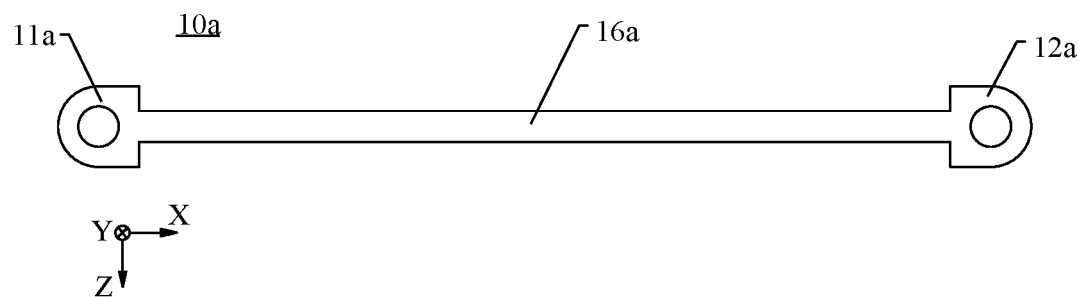
FIG. 16 is a schematic diagram of a structure of a flexible support member in a foldable electronic device according to Embodiment 2 of this application.

Refer to FIG. 16. FIG. 16 is a schematic diagram of a structure of a flexible support member 10 in a foldable electronic device 500 according to Embodiment 2 of this application.

The flexible support member 10a includes a first side portion 11a, a second side portion 12a, and a bending portion 16a, and the bending portion 16a is connected between the first side portion 11a and the second side portion 12a. The bending portion 16a is made of a flexible material. Specifically, the bending portion 16a may be made of a rubber material, or may be made of a thermoplastic elastomer or another flexible material. In this embodiment, a flexible material is used completely between the first side portion 11a and the second side portion 12a, and greater deformation of the flexible support member 10a can be generated under applied force, so as to further provide bending space for a bending part of a display 300, and avoid adverse phenomena such as creases on the display 300, thereby prolonging service life of the display 300.

Figure 17:
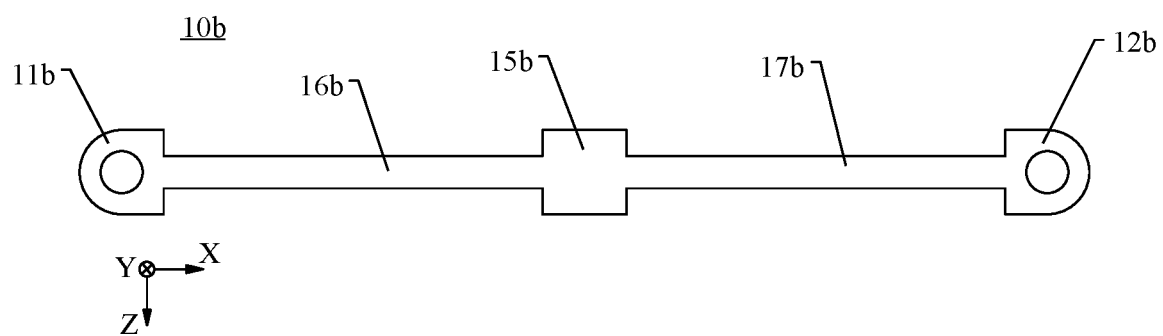
FIG. 17 is a schematic diagram of a structure of a flexible support member in a foldable electronic device according to Embodiment 3 of this application.

Refer to FIG. 17. FIG. 17 is a schematic diagram of a structure of a flexible support member 10 in a foldable electronic device 500 according to Embodiment 3 of this application.

The flexible support member 10b includes a first side portion 11b, a second side portion 12b, a first bending portion 16b, a second bending portion 17b, and a rigid portion 15b. The first bending portion 16b and the second bending portion 17b are respectively connected to two opposite sides of the rigid portion 15b along an X direction, and the first bending portion 16b and the second bending portion 17b are symmetric with respect to the rigid portion 15b. One end, facing away from the rigid portion 15b, of the first bending portion 16b is connected to the first side portion 11b, and one end, facing away from the rigid portion 15b, of the second bending portion 17b is connected to the second side portion 12b. In other words, the first side portion 11b, the first bending portion 16b, the rigid portion 15b, the second bending portion 17b, and the second side portion 12b are sequentially connected.

The first bending portion 16b and the second bending portion 17b are made of a flexible material. Specifically, the first bending portion 16b and the second bending portion 17b may be made of a rubber material, or may be made of a thermoplastic elastomer or another flexible material. The rigid portion 15b is made of a rigid material, such as a metallic material. For example, the rigid portion 15b is made of a material such as stainless steel, aluminum, or copper. The first bending portion 16b and the second bending portion 17b made of a flexible material is prone to deformation under applied force, so as to provide bending space for a bending part of a display 300, and avoid adverse phenomena such as creases on the display 300, thereby prolonging service life of the display 300. The rigid portion 15b made of a rigid material is not prone to deformation, has relatively high strength, and has an effect of increasing strength of the flexible support member 10b, and meanwhile, a preset shape can be formed when the flexible support member 10b is in a folded state, so that the flexible support member 10b can better fit the bending part of the display 300.

Figure 18:
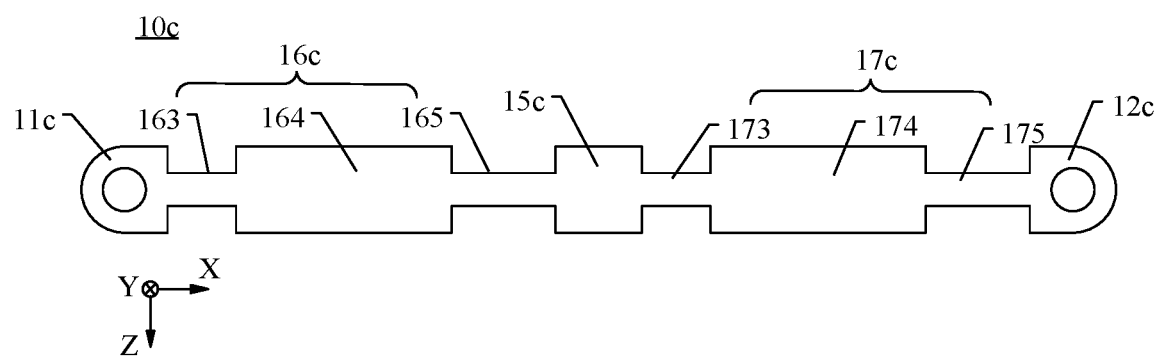
FIG. 18 is a schematic diagram of a structure of a flexible support member in a foldable electronic device according to Embodiment 4 of this application.

Refer to FIG. 18. FIG. 18 is a schematic diagram of a structure of a flexible support member 10 in a foldable electronic device 500 according to Embodiment 4 of this application.

The flexible support member 10c includes a first side portion 11c, a second side portion 12c, a first bending portion 16c, a second bending portion 17c, and a rigid portion 15c. The first bending portion 16c and the second bending portion 17c are respectively connected to two opposite sides of the rigid portion 15c along the X direction, and the first bending portion 16c and the second bending portion 17c are symmetric c with respect to the rigid portion 15c. The first bending portion 16c includes a first rigid section 164, a first flexible section 163, and a second flexible section 165. The first flexible section 163 and the second flexible section 165 are respectively connected to two opposite sides of the first rigid section 164. The first flexible section 163 is connected to the first side portion 11c, and the second flexible section 165 is connected to the rigid portion 15c. The second bending portion 17c includes a second rigid section 174, a third flexible section 173, and a fourth flexible section 175. The third flexible section 173 and the fourth flexible section 175 are respectively connected to two opposite sides of the second rigid section 174. The third flexible section 173 is connected to the rigid portion 15c, and the fourth flexible section 175 is connected to the second side portion 12c.

The first flexible section 163, the second flexible section 165, the third flexible section 173, and the fourth flexible section 175 are all made of a flexible material, which may be specifically a rubber material, a thermoplastic elastomer, or another flexible material. The rigid portion 15c, the first rigid section 164, and the second rigid section 174 are all made of a rigid material, such as a metallic material. When a rotating mechanism 100 is in a folded state, the first flexible section 163, the second flexible section 165, the third flexible section 173, and the fourth flexible section 175 are all bent, so that the flexible support member 10 is bent to form avoidance space, so as to provide bending space for a display 300, and avoid adverse phenomena such as creases on the display 300, thereby prolonging service life of the display 300. Strength of the flexible support member 10 can be further increased by disposing the first rigid section 164 and the second rigid section 174. Moreover, when the rotating mechanism 100 is in the folded state, the flexible support member 10 can be bent to form a preset shape, so that the flexible support member 10 can better fit a foldable part of the display 300.

The foregoing descriptions are merely some embodiments and implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotating mechanism, comprising a fixed base, a flexible support member, a first rotating member, and a second rotating member, wherein
the fixed base is provided with a first rotating groove and a second rotating groove, the first rotating groove and the second rotating groove are disposed opposite to each other, the flexible support member comprises a first side portion and a second side portion, the first side portion and the second side portion are respectively located on two opposite sides of the flexible support member, and the flexible support member is located on a surface of the fixed base;
the first rotating member comprises a first swingarm, the first swingarm comprises a first rotating body and a first rotating portion, the first rotating body is fixedly connected to the first rotating portion, the first rotating portion is rotatably connected to the first side portion of the flexible support member, and the first rotating body is installed in the first rotating groove and capable of sliding along the first rotating groove; and
the second rotating member comprises a second swingarm, the second swingarm comprises a second rotating body and a second rotating portion, the second rotating body is fixedly connected to the second rotating portion, the second rotating portion is rotatably connected to the second side portion of the flexible support member, the second rotating body is installed in the second rotating groove and capable of sliding along the second rotating groove; and rotation directions of the first rotating member and the second rotating member relative to the flexible support member are opposite.

2. The rotating mechanism according to claim 1, wherein the rotating mechanism has an unfolded state and a folded state, and when the rotating mechanism is in the folded state, the flexible support member is bent to form avoidance space.

3. The rotating mechanism according to claim 2, wherein the flexible support member comprises a bending portion, the bending portion is connected between the first side portion and the second side portion, and the bending portion is bendable.

4. The rotating mechanism according to claim 2, wherein the flexible support member comprises a rigid portion, a first bending portion, and a second bending portion, the first bending portion is connected between the rigid portion and the first side portion, the second bending portion is connected between the rigid portion and the second side portion, and both the first bending portion and the second bending portion are bendable.

5. The rotating mechanism according to claim 4, wherein the first bending portion comprises a first rigid section, a first flexible section, and a second flexible section, the first flexible section and the second flexible section are respectively connected to two opposite sides of the first rigid section, the first flexible section is connected to the first side portion, and the second flexible section is connected to the rigid portion; and
the second bending portion comprises a second rigid section, a third flexible section, and a fourth flexible section, the third flexible section and the fourth flexible section are respectively connected to two opposite sides of the second rigid section, the third flexible section is connected to the rigid portion, and the fourth flexible section is connected to the second side portion.

6. The rotating mechanism according to claim 4, wherein the first bending portion comprises a first bending sub-portion and a second bending sub-portion, the first bending sub-portion and the second bending sub-portion are arranged at intervals side by side along a thickness direction of the flexible support member, two opposite ends of the first bending sub-portion are respectively connected to the rigid portion and the first side portion, and two opposite ends of the second bending sub-portion are respectively connected to the rigid portion and the first side portion; and
the second bending portion comprises a third bending sub-portion and a fourth bending sub-portion, the third bending sub-portion and the fourth bending sub-portion are arranged at intervals side by side along the thickness direction of the flexible support member, two opposite ends of the third bending sub-portion are respectively connected to the rigid portion and the second side portion, and two opposite ends of the fourth bending sub-portion are respectively connected to the rigid portion and the second side portion.

7. The rotating mechanism according to claim 6, wherein the first bending sub-portion comprises a first rigid sub-section, a first flexible sub-section, and a second flexible sub-section, the first flexible sub-section and the second flexible sub-section are respectively connected to two opposite sides of the first rigid sub-section, the first flexible sub-section is connected to the first side portion, and the second flexible sub-section is connected to the rigid portion;
the second bending sub-portion comprises a second rigid sub-section, a third flexible sub-section, and a fourth flexible sub-section, the third flexible sub-section and the fourth flexible sub-section are respectively connected to two opposite sides of the second rigid sub-section, the third flexible sub-section is connected to the first side portion, and the fourth flexible sub-section is connected to the rigid portion;
the third bending sub-portion comprises a third rigid sub-section, a fifth flexible sub-section, and a sixth flexible sub-section, the fifth flexible sub-section and the sixth flexible sub-section are respectively connected to two opposite sides of the third rigid sub-section, the fifth flexible sub-section is connected to the rigid portion, and the sixth flexible sub-section is connected to the second side portion; and
the fourth bending sub-portion comprises a fourth rigid sub-section, a seventh flexible sub-section, and an eighth flexible sub-section, the seventh flexible sub-section and the eighth flexible sub-section are respectively connected to two opposite sides of the fourth rigid sub-section, the seventh flexible sub-section is connected to the rigid portion, and the eighth flexible sub-section is connected to the second side portion.

8. The rotating mechanism according to claim 1, wherein the flexible support member is provided with a first through-hole and a second through-hole, the first through-hole and the first swingarm are disposed opposite to each other, and the second through-hole and the second swingarm are disposed opposite to each other; and when the rotating mechanism is in the unfolded state, the first through-hole is configured to accommodate an end part of the first swingarm, and the second through-hole is configured to accommodate an end part of the second swingarm.

9. The rotating mechanism according to claim 1, wherein one end of the first rotating body is provided with a first avoidance groove, and a groove opening direction of the first avoidance groove is in an extending direction of the first rotating body; and one end of the second rotating body is provided with a second avoidance groove, and a groove opening direction of the second avoidance groove is in an extending direction of the second rotating body.

10. The rotating mechanism according to claim 1, wherein when the first rotating body rotates relative to the fixed base along the first rotating groove and the second rotating body rotates relative to the fixed base along the second rotating groove, the first rotating portion and the second rotating portion drive the flexible support member to bend or unfold.

11. The rotating mechanism according to claim 1, wherein the first swingarm further comprises a first swing portion, and the first swing portion is fixedly connected to the first rotating body; and when the first swing portion rotates relative to the fixed base, the first rotating body slides along the first rotating groove, the first rotating portion rotates relative to the flexible support member, and the first rotating portion drives the flexible support member to bend or unfold; and the second swingarm further comprises a second swing portion, and the second swing portion is fixedly connected to the second rotating body; and when the second swing portion rotates relative to the fixed base, the second rotating body slides along the second rotating groove, the second rotating portion rotates relative to the flexible support member, and the second rotating portion drives the flexible support member to bend or unfold.

12. The rotating mechanism according to claim 11, wherein the first swingarm further comprises a first rotating shaft, the first rotating shaft is fixedly connected to one end, facing away from the first rotating body, of the first swing portion, the first rotating member further comprises a first fixing plate, and the first fixing plate is rotatably connected to the first rotating shaft; and the second swingarm further comprises a second rotating shaft, the second rotating shaft is fixedly connected to one end, facing away from the second rotating body, of the second swing portion, the second rotating member further comprises a second fixing plate, and the second fixing plate is rotatably connected to the second rotating shaft;

when the first fixing plate and the second fixing plate rotate in a direction of approaching each other, the first swingarm and the second swingarm rotate relative to the fixed base in a direction of approaching each other, and the first rotating portion and the second rotating portion drive the flexible support member to bend, so that the rotating mechanism is in the folded state; and when the first fixing plate and the second fixing plate rotate in a direction of getting away from each other, the first swingarm and the second swingarm rotate relative to the fixed base in a direction of getting away from each other, and the first rotating portion and the second rotating portion drive the flexible support member to be flattened, so that the rotating mechanism is in the unfolded state.

13. The rotating mechanism according to claim 12, wherein the rotating mechanism further comprises a first door panel and a second door panel, the first door panel is fixedly connected to the first fixing plate, and the second door panel is fixedly connected to the second fixing plate;

when the first door panel and the second door panel rotate in a direction of approaching each other, the first rotating member and the second rotating member rotate relative to the fixed base in a direction of approaching each other, and the first rotating portion and the second rotating portion drive the flexible support member to bend, so that the rotating mechanism is in the folded state; and when the first door panel and the second door panel rotate in a direction of getting away from each other, the first rotating member and the second rotating member rotate relative to the fixed base in a direction of getting away from each other, and the first rotating portion and the second rotating portion drive the flexible support member to be flattened, so that the rotating mechanism is in the unfolded state.

14. The rotating mechanism according to claim 1, wherein the fixed base is further provided with a first auxiliary rotating groove and a second auxiliary rotating groove, the first auxiliary rotating groove and the first rotating groove are arranged side by side, and an extending direction of the first auxiliary rotating groove is the same as an extending direction of the first rotating groove, the second auxiliary rotating groove and the second rotating groove are arranged side by side, and an extending direction of the second auxiliary rotating groove is the same as an extending direction of the second rotating groove; and the first swingarm further comprises a first auxiliary rotating body, the first auxiliary rotating body is fixedly connected to the first rotating body, an extending direction of the first auxiliary rotating body is same as an extending direction of the first rotating body, and the first auxiliary rotating body is installed in the first auxiliary rotating groove and is slidable along the first auxiliary rotating groove; and the second swingarm further comprises a second auxiliary rotating body, the second auxiliary rotating body is fixedly connected to the second rotating body, an extending direction of the second auxiliary rotating body is same as an extending direction of the second rotating body, and the second auxiliary rotating body is installed in the second auxiliary rotating groove and is slidable along the second auxiliary rotating groove.

15. A foldable electronic device, comprising a first casing, a second casing, a display, and the rotating mechanism according to claim 1, wherein the rotating mechanism is connected between the first casing and the second casing, the display is installed on the first casing, the second casing, and the rotating mechanism, and when the rotating mechanism rotates, the first casing and the second casing rotate relative to each other, to drive the display to bend or unfold.

16. The foldable electronic device according to claim 15, wherein the display comprises a first display part, a second display part, and a foldable part, the foldable part is connected between the first display part and the second display part, the first display part is installed on the first casing, the second display part is installed on the second casing, and the foldable part and the rotating mechanism are disposed opposite to each other.

17. The foldable electronic device according to claim 16, wherein when the foldable electronic device is in a folded state, the flexible support member is bent to form avoidance space, and the foldable part is at least partially located in the avoidance space.

* * * * *

UNITED STATES PATENT AND TRADEMARK OFFICE
CERTIFICATE OF CORRECTION

| | | Page 1 of 1 |
|---|---|---|
| PATENT NO. | : 12,259,761 B2 | |
| APPLICATION NO. | : 18/005918 | |
| DATED | : March 25, 2025 | |
| INVENTOR(S) | : Kun Liu et al. | |

It is certified that error appears in the above-identified patent and that said Letters Patent is hereby corrected as shown below:

On the Title Page

In Column 1 (Applicant), In Line 2, Delete "Guangdong" and insert -- Shenzhen --.

In the Specification

In Column 1, In Line 14-19 (Approx.), Below "entireties." delete "This application claims priority to Chinese Patent Application No. 202111132029.1, filed with China National Intellectual Property Administration on Sep. 26, 2021 and entitled "ROTATING MECHANISM AND FOLDABLE ELECTRONIC DEVICE", which is incorporated herein by reference in its entirety.".

Signed and Sealed this
Tenth Day of February, 2026

John A. Squires
*Director of the United States Patent and Trademark Office*